(12) United States Patent
Kekki et al.

(10) Patent No.: US 8,538,433 B2
(45) Date of Patent: *Sep. 17, 2013

(54) METHOD, RADIO SYSTEM, AND BASE STATION

(75) Inventors: Sami J. Kekki, Helsinki (FI); Ivan Ore, Nummela (FI); Seppo Ilmari Vesterinen, Oulunsalo (FI)

(73) Assignee: Nokia Siemens Networks Oy, Espoo (FI)

( * ) Notice: Subject to any disclaimer, the term of this patent is extended or adjusted under 35 U.S.C. 154(b) by 356 days.

This patent is subject to a terminal disclaimer.

(21) Appl. No.: 12/451,118

(22) PCT Filed: Apr. 25, 2008

(86) PCT No.: PCT/EP2008/055068
§ 371 (c)(1),
(2), (4) Date: Apr. 14, 2010

(87) PCT Pub. No.: WO2008/132163
PCT Pub. Date: Nov. 6, 2008

(65) Prior Publication Data
US 2010/0195621 A1    Aug. 5, 2010

(30) Foreign Application Priority Data
Apr. 27, 2007  (FI) ..................................... 20075297

(51) Int. Cl.
*H04W 36/00* (2009.01)
(52) U.S. Cl.
USPC ........... 455/436; 370/331; 370/328; 370/310; 370/352; 455/456.1
(58) Field of Classification Search
USPC .............. 455/436, 456.1; 370/331, 328, 310, 370/352
See application file for complete search history.

(56) References Cited

U.S. PATENT DOCUMENTS

| | | | | |
|---|---|---|---|---|
| 6,608,831 B1 * | 8/2003 | Beckstrom et al. | ........... | 370/352 |
| 2004/0208153 A1 * | 10/2004 | Mizell et al. | ................... | 370/338 |

(Continued)

FOREIGN PATENT DOCUMENTS

| | | |
|---|---|---|
| EP | 1 079 656 A1 | 2/2001 |
| WO | 2004/036332 A2 | 4/2004 |

(Continued)

OTHER PUBLICATIONS

"Local Breakout Concepts for Intra-PLMN"; 3GPP SA WG2 Apr. 2007; printed on Oct. 27, 2009 from www.3gpp.org/FTP/TSGSA/ WG2_Arch/TSGS2_57_Beijing/AgendaWithTdocAllocation_ 2007-05-15_22h19.htm; pp. 1-5.

(Continued)

*Primary Examiner* — Charles Shedrick
(74) *Attorney, Agent, or Firm* — Staas & Halsey LLP

(57) ABSTRACT

In a radio system having at least one base station that is part of a public mobile network, at least one mobile terminal communicates with the at least one base station, a local breakout service network provides Internet protocol gateway services. A serving base station of a mobile terminal is configured to provide the local breakout service to the Internet protocol gateway while retaining user access control and a remote Internet protocol gateway of a packet core network of the public mobile network for the mobile terminal; to provide information on neighboring cells in which the local breakout service can continue; to make a handover decision based on measurement reports received from the mobile terminal; and to transfer user context data including local breakout service related information to a target base station during handover for providing mobility within the local breakout service area for the mobile terminal.

36 Claims, 24 Drawing Sheets

(56) References Cited

U.S. PATENT DOCUMENTS

| | | |
|---|---|---|
| 2006/0166672 A1* | 7/2006 | Lim et al. ............... 455/436 |
| 2007/0253359 A1* | 11/2007 | Hall et al. ............... 370/328 |
| 2008/0137592 A1* | 6/2008 | Ahmavaara et al. ....... 370/328 |
| 2008/0144574 A1* | 6/2008 | Jayapalan et al. ........ 370/331 |
| 2008/0259873 A1* | 10/2008 | Ahmavaara et al. ....... 370/331 |
| 2008/0285492 A1* | 11/2008 | Vesterinen ............. 370/310 |

FOREIGN PATENT DOCUMENTS

| | | |
|---|---|---|
| WO | 2006/088319 A2 | 8/2006 |
| WO | 2006/130058 A1 | 12/2006 |

OTHER PUBLICATIONS

3rd Generation Partnership Project; Technical Specification Group Services and System Aspects; 3GPP System Architecture Evolution: GPRS Enhancements for E-UTRAN access; Release 8; 3GPP TS 23.401 v.0.4.1. Apr. 2007; printed on Oct. 27, 2009 from www.3gpp.org/ftp/tsg_sa/WG2_Arch/TSGS2_57_Beijing/TdocList_2007-05-15_22h19.htm; pp. 1-41.

Universal Mobile Telecommunications Systems (UMTS); Feasibility Study on 3GPP System to Wireless Local Area Network (WLAN) interworking (3GPP TR 22.934 version 6.2.0 Release 6); ETSI TR 122 934;Sep. 2003; pp. 1-32.

* cited by examiner

METHOD, RADIO SYSTEM, AND BASE STATION

CROSS REFERENCE TO RELATED APPLICATIONS

This application is the U.S. national stage of International Application No. PCT/EP2008/055068, filed Apr. 25, 2008 and claims the benefit thereof. The international application claims the benefit of Finland Application No. 20075297 filed on Apr. 27, 2007; both applications are incorporated by reference herein in their entirety.

BACKGROUND

Described below are a method, a radio system, a base station, and a computer program distribution medium.

Cellular operators may nowadays offer a local IP (Internet Protocol) connectivity within a certain area (local IP breakout) without roaming, with limited user mobility and IP session continuation being an alternative to the ordinary cellular packet data services with roaming and global mobility support. Such local IP connectivity may be provided within a local zone in a city center or any limited geographical area, an enterprise network or a home where radio coverage is available. In minimum, this kind of local IP breakout can be provided using one radio cell/base station and it may be expanded to a wide radio coverage area in the operator's nation wide domain (PLMN). For example, LTE/SAE (Long Term Evolution/System Architecture Evolution) service with roaming, and global/Inter Radio Access mobility with IP session continuation may be overlapping and may share the same cells/base stations that provide the local IP breakout service.

Network access to ordinary cellular packet data services is enabled e.g. in LTE/SAE via the cellular operator's core network that provides global roaming and mobility support. Normally UE (User Equipment, Mobile terminal) is connected to the radio network, such as E-UTRAN (Enhanced universal terrestrial radio access network) in the LTE/SAE of this example, in a way that a SAE Gateway that is located in the core network provides an IP point of attachment to the UE. The selection of this gateway takes place during an Initial Attach procedure when the UE is also authenticated and authorized to use the network services. The SAE Gateway can be selected either from the visited PLMN (Public Mobile Network) or the UE's home PLMN, depending on the roaming agreement between the operators. If a SAE Gateway is selected from the visited PLMN, a "local breakout" with roaming is in question.

In order to enable more local IP breakout services, a public mobile network gateway element, such as a SAE Gateway element, is required e.g. in the customer premises, home, office, or otherwise the local traffic has to be routed all the way to a centralized public mobile network gateway in the operator's premises and then back to the customer's infrastructure. One of the problems related to the known solutions is that the user data has to be traversed via the centralized public mobile network gateway, such as the SAE Gateway. Non-optimal user data routing increases transfer delays in the transport network, causing longer round trip time (RTT) for the user data correspondingly. Thus, for example, downloading times of Internet pages become longer as long RTT limits the data transfer speed of the TCP (transmission control protocol) protocol.

For example, in 3GPP, a "local breakout" has been understood as a U-plane Anchor selection from the visited PLMN rather than as a way of using a SAE Gateway from the home PLMN while roaming. In a known intra PLMN local breakout solution, route optimization is provided when the UE is moving far away from the current SAE Gateway. This is implemented by reselecting a new SAE Gateway when the UE moves to a new region and taking the new SAE Gateway and IP address in use after detecting inactivity in the old sessions and using the new local IP address for new sessions. Full relocation to a new SAE Gateway occurs when all old sessions are terminated. This solution aims to provide an optimized IP routing by moving the SAE Gateway in the core network closer to the UE while it moves within the PLMN. However, solutions are needed where a more local IP breakout gateway can be selected closer to the base stations for providing localized packet data services that could be used in parallel with the centralized packet data services in the public mobile networks. In this way the public mobile networks could also provide "local calls" instead of forcing all calls to be long distance calls.

In order to tightly integrate private "local breakout" cells into EUTRAN procedures, for example, the radio access network should be equipped with detailed procedures to handle the handover of private cells in E-UTRAN. Currently there is a need to determine how eNodeB can enable different handover decisions considering public and private cells. During the UE measurement reports in a dedicated mode, UE may report a Tracking Area (TA) and a cell ID of the neighbor cell. This information is not enough for eNodeB as it is not able to distinguish if the reported cell comes from a private cell or a public cell, unless different TA value ranges are used for public and private cells. Restricting the use of different tracking areas for private and public cells is however not desirable in order to avoid increasing the length of the TA to overcome capacity problems.

SUMMARY

An improved method, a radio system, a base station, and a computer program distribution medium are described below.

According to an aspect, described below is a method of providing a local breakout service to an Internet protocol gateway while retaining user access control and a remote Internet protocol gateway of a packet core network of a public mobile network for a mobile terminal; providing information on neighboring cells in which the local breakout service can continue; making a handover decision based on measurement reports received from the mobile terminal; and transferring user context data including local breakout service related information from a source base station to a target base station during handover for providing mobility within the local breakout service area for the mobile terminal.

According to another aspect, described below is a radio system having one or more base stations of a public mobile network, at least one mobile terminal communicating with the one or more base stations, and a local breakout service network providing Internet protocol gateway services, wherein: a serving base station of a mobile terminal is configured to provide the local breakout service to the Internet protocol gateway while retaining user access control and a remote Internet protocol gateway of a packet core network of the public mobile network for the mobile terminal; to provide information on neighboring cells in which the local breakout service can continue; to make a handover decision based on measurement reports received from the mobile terminal; and to transfer user context data including local breakout service related information to a target base station during handover for providing mobility within the local breakout service area for the mobile terminal.

According to another aspect, described below is a base station of a public mobile network having a communication unit configured to communicate with at least one mobile terminal, and with a local breakout service network providing Internet protocol gateway services. The base station includes a processing unit configured to provide the local breakout service to the Internet protocol gateway while retaining user access control and a remote Internet protocol gateway of a packet core network of the public mobile network for a mobile terminal; a communication unit configured to provide information on neighboring cells in which the local breakout service can continue; a processing unit configured to make a handover decision based on measurement reports received from the mobile terminal; and a communication unit configured to transfer user context data including local breakout service related information to a target base station during handover for providing mobility within the local breakout service area for the mobile terminal.

According to another aspect, described below is a computer program distribution medium readable by a computer and encoding a computer program of instructions for executing a computer process of providing a local breakout service to an Internet protocol gateway while retaining user access control and a remote Internet protocol gateway of a packet core network of a public mobile network for a mobile terminal; providing information on neighboring cells in which the local breakout service can continue; making a handover decision based on measurement reports received from the mobile terminal; and transferring user context data including local breakout service related information from a source base station to a target base station during handover for providing mobility within the local breakout service area for the mobile terminal.

According to another aspect, described below is a radio system including one or more base stations of a public mobile network, at least one mobile terminal communicating with the one or more base stations, and a local breakout service network providing Internet protocol gateway services. The radio system further includes a processor programmed to provide the local breakout service to the Internet protocol gateway while retaining user access control and a remote Internet protocol gateway of a packet core network of the public mobile network for a mobile terminal; communication unit(s) providing means for supplying information on neighboring cells in which the local breakout service can continue; while the processor or another processor is programmed to make a handover decision based on measurement reports received from the mobile terminal; and the communication unit(s) provide means for transferring user context data including local breakout service related information to a target base station during handover for providing mobility within the local breakout service area for the mobile terminal.

According to another aspect, described below is a base station of a public mobile network having communication unit(s) providing means for communicating with at least one mobile terminal, and with a local breakout service network providing Internet protocol gateway services. The base station further includes a processor programmed to provide the local breakout service to the Internet protocol gateway while retaining user access control and a remote Internet protocol gateway of a packet core network of the public mobile network for a mobile terminal; the communication unit(s) also provide means for supplying information on neighboring cells in which the local breakout service can continue; while the processor or another processor is programmed to make a handover decision based on measurement reports received from the mobile terminal; and the communication unit(s) also provide means for transferring user context data including local breakout service related information to a target base station during handover for providing mobility within the local breakout service area for the mobile terminal.

There are several advantages provided. A mobile terminal that is normally registered into a public mobile network, e.g. LTE/SAE network, may select a local IP connectivity (IP Point of Attachment) to Intranet, or Internet services directly from the public mobile network Cell(s)/Base Station(s) and the next hop Access Router, or any Access Router serving as the gateway to the local IP Routing Area and the network is capable to support local area mobility within the local IP breakout service area. Optimal user data routing is provided so that all data need not to traverse via the centralized SAE GW and a direct terminal-to-terminal communications, terminal to local services and terminal to Internet becomes possible within the local breakout service area. A mobile terminal is able to switch back to standard LTE/SAE Core Network services anytime as it is assumed that the Core Network may maintain User Registration, Location Tracking, State Management and default SAE Bearer service as usual. For an Enterprise Network solution no other LTE specific nodes are needed in addition to the LTE Base Station(s) as e.g. an ordinary and existing Corporate Gateway can be used to provide the local IP connectivity. For example WLAN solution requires a WLAN Switch in order to connect/manage multiple WLAN Access Points and to support handovers between these. WLAN type services are enabled in LTE/SAE without requiring multiple radios in terminals.

The radio network topology can be arranged to groups of LTE Cells that form a Local IP Breakout Service area that may overlap with the upper Macro Layer Tracking Areas. The mobile terminal is not required to maintain separated Idle modes both for SAE Bearer Services and Local IP Breakout Services.

BRIEF DESCRIPTION OF THE DRAWINGS

These and other aspects and advantages will become more apparent and more readily appreciated from the following description of the exemplary embodiments, taken in conjunction with the accompanying drawings, of which.

DETAILED DESCRIPTION OF THE PREFERRED EMBODIMENT

Figure 1:
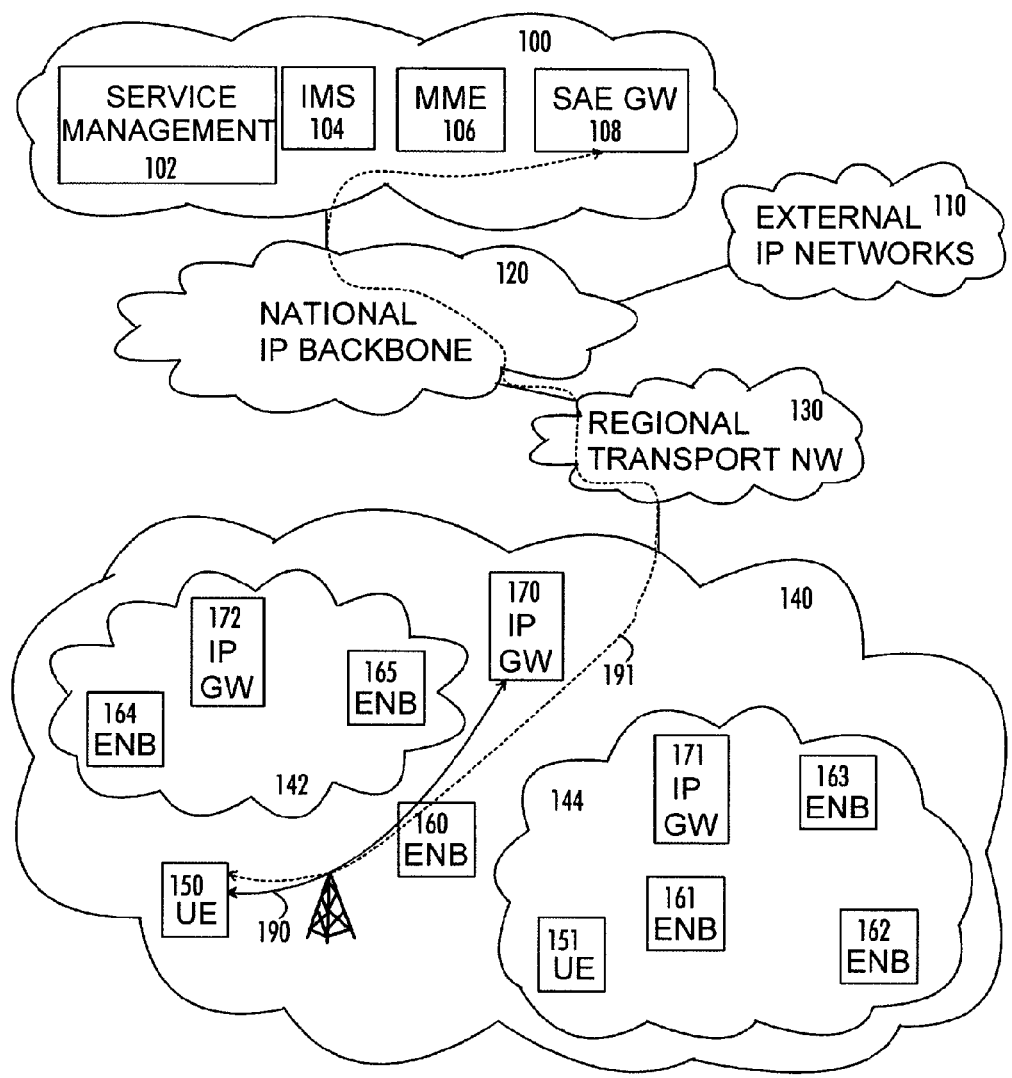
FIG. 1 is a block diagram of an example of a radio system.

Reference will now be made in detail to the preferred embodiments, examples of which are illustrated in the accompanying drawings, wherein like reference numerals refer to like elements throughout.

With reference to FIG. 1, an example of a radio system is illustrated to which embodiments can be applied. In this example, the radio system is based on LTE/SAE (Long Term Evolution/System Architecture Evolution) network elements. However, the invention is not limited to the LTE/SAE radio systems but can also be implemented in other radio systems, such as HSDPA (high speed downlink packet access), HSUPA (high speed uplink packet access), WIMAX (Worldwide Interoperability for Microwave Access), Internet HSPA, or in other suitable radio systems.

The exemplary radio system of FIG. 1 includes a service core 100 of an operator including the following elements: a service management 102, IMS (IP multimedia subsystem) 104, an MME (Mobility Management Entity) 106, and an SAE GW (SAE Gateway) 108.

Traffic between mobile terminals 150, 151 and the service core network 100 is carried via a national IP backbone network 120, a regional transport network 130, and a local area aggregation network 140. eNBs (Enhanced node Bs) 160 to 165 of the radio system host the functions for Radio Resource Management: Radio Bearer Control, Radio Admission Control, Connection Mobility Control, Dynamic Resource Allocation (scheduling). The MME 106 is responsible for distributing paging messages to the eNBs 160 to 165.

Usually radio networks are based on a single switch model. This is implemented in the LTE/SAE network by the SAE GW (SAE Gateway) 108. All calls/services are "long distance" due to forcing user traffic to pass via the SAE GW 108. For example, a connection from a mobile terminal 150 to an external IP networks 110, such as to the Internet 110, is typically guided via a route indicated with a dashed line 191. However, the embodiments use "local calls/services" also in the mobile networks.

In the following examples, selecting and connecting to an ordinary IP Gateway 170 to 172 (Access Router) for a local IP breakout from a LTE base station 160 to 165 while retaining user access control and SAE GW 108 in the LTE/SAE operator's packet core network 100 is enabled. It is assumed that the registration to the default SAE Bearer services using an IP address from the SAE GW 108 is available, even if not necessarily used for active sessions.

Local breakout services providing Internet protocol gateway services can be provided via local IP gateways 170 to 172. The IP gateways 170 to 172 may reside, for example, in a corporate network 144 or in a specific local area 142, such as a city area. This provides optimal data routing such that all data is not required to traverse via the centralized SAE GW 108. For example, a solid line 190 illustrates how the local breakout service is provided for a mobile terminal 150. This way, direct terminal-to-terminal communications (e.g. between 150 and 151), terminal-to-local services and terminal to Internet become possible within the local breakout service area.

A mobile terminal 150, 151 in a local area network 140 is configured to detect availability of a local breakout service to an Internet protocol gateway; to start a network entry to the local breakout service; and to configure an Internet protocol stack of the mobile terminal on the basis of received configuration data. The serving base station 160, 161 of the mobile terminal is configured to establish a radio bearer for the local breakout service; to provide a dynamic host control protocol relay function for mapping data of the mobile terminal using a local Internet protocol address to the established radio bearer; and to provide the local breakout service to the Internet protocol gateway 170, 171, 172 while retaining user access control and a remote Internet protocol gateway of a packet core network 100 of the public mobile network for the mobile terminal 150, 151.

The availability of the local breakout service via the mobile terminal's 150, 151 current LTE Cell/Base Station 160 to 165 could be indicated to the mobile terminal 150, 151 by one of the following: advertisements in LTE Cell System Information from the base station (configured into LTE Cell/Base Station Radio Network Configuration data), indicating the local breakout service availability to the mobile terminal 150, 151 in NAS (Non-Access-Stratum) signaling when the mobile terminal 150, 151 has moved to a service coverage area, e.g. as part of a Tracking Area Update procedure, Idle to Active State transition, or inter LTE Base Station Handover (location based service triggered from the Evolved Packet Core), the mobile terminal 150, 151 itself may detect movement to an LTE Cell in which Cell Id, Tracking Area Id and Network Id match local IP breakout service related information stored in non-volatile memory of the mobile terminal, or a user intervention from application level when the end-user is e.g. at the office (manual registration into an Enterprise Network).

When the User/mobile terminal 150, 151 has received the indication about service availability, the network entry procedure to a local IP breakout service may be started automatically from the mobile terminal 150, 151, or manually by an end-user intervention.

The scope of IP connectivity via the local IP breakout service may be anything from one LTE Cell/Base Station 160 to 165 to a Tracking Area that is formed of multiple neighboring LTE Cells/Base Stations covering the following cases: Direct connectivity to Internet from a home LTE Cell/Base Station like using WLAN Access Point and DSL modem (could be the nearest LTE Cell at home, not necessarily inside the housebut e.g. a designated cell in the neighborhood); a Enterprise Network providing Intranet connectivity to local services and a direct connectivity to the Internet via the Enterprise Gateway. "Femto" LTE Base Stations could be applied for improving indoor coverage in corporate premises that with nearby public LTE Cells/Base Stations form a local breakout Tracking Area in which cells may be shared by LTE/SAE users using SAE GW services; a local zone (e.g. shopping center, city area etc.) including multiple Cells/Base Stations forming a Tracking Area that is shared by LTE/SAE users and local IP breakout users.

The authentication into the LTE/SAE network can be trusted only in cases where the LTE/SAE operator provides the IP Gateway 170 to 172 for the local IP breakout service. In the Enterprise Network solutions the user/mobile terminal must be authenticated and authorized separately in order to enable user-plane connection to the Enterprise Intranet. The LTE Base Stations 160 to 165 may support UE authentication to Enterprise Network Authentication Server e.g. by using RADIUS when required. The required static information/settings for this feature in the LTE Base station could be included in the Base Station configuration data and the dynamic user/UE specific information could be received from the Core Network (e.g. from the MME node).

For security reasons the LTE Base Station 160 to 165 may allow the mobile terminal 150, 151 to transfer initially only authentication-related messages to the local Authentication Server, and direct user-plane connectivity to a local access network is to be enabled only for authenticated users. The LTE Base Station 160-165 is to set up a separate Radio Bearer for the local IP breakout service in order to differentiate user data from the default SAE Bearer that is to be tunneled to the SAE GW 108.

In its simplest form the direct user-plane connectivity could be enabled from the LTE Base Station 160 to 165 to a local access network based on User/UE User Context data that is received from the LTE/SAE Core Network (e.g. from the MME node). This data may contain subscriber-specific information indicating that the local IP breakout service is allowed. However, if authentication into LTE/SAE network is considered sufficient also for the local IP breakout service, the LTE Base Station 160 to 165 may set up the required radio bearer on the user plane automatically, i.e. additional authentication may be skipped.

If additional authentication to the local IP breakout service is required locally, the LTE Base Station 160 to 165 is to allow initially only transmission of authentication related messages in "direct transfer" messages over the control plane interface. Now the required radio bearer on the user plane is to be set up only after successful authentication.

The LTE Base Station 160 to 165 may serve as an Authentication Relay towards the local Authentication Server, or it may serve as a local Authenticator itself. In the latter case, the required subscriber-specific identifiers and security data (e.g. user name and password) should be available in the LTE Base station e.g. in the user context received from the Core Network.

The mobile terminal 150,151 may receive an IP address for the local IP breakout service with authentication-related signaling. If the authentication procedure does not support IP address assignment, the mobile terminal 150, 151 must obtain the local IP address e.g. by using a DHCP protocol over the newly established Radio Bearer. The LTE Base Station 160 to 165 provides a DHCP Relay function in order to forward DHCP related messages to/from a local DHCP Server and to be able to read received IP configuration data that is required for mapping the user data using the local IP address to the Radio Bearer (requires IP lookup in LTE Base Station).

An alternative method for triggering the radio bearer setup for the local breakout service in the LTE Base Station 160 to 165 could be detecting the DHCP Discovery message that is either encapsulated into a control plane message (RRC protocol), or transferred over the existing SAE Bearer on the user plane. The latter requires IP lookup in the LTE Base Station 160-165 also for the SAE Bearer IP packets in the uplink direction.

Once the mobile terminal 150, 151 has configured its IP stack (either based on received configuration data in authentication, or using DHCP), the Radio Bearer for local breakout is set up, and the LTE Base Station 160 to 165 has configured its network interface to route the local user data, the Network Entry procedure to the Local IP breakout service is completed and local IP connectivity is available for transferring user data.

In order to provide mobility within the local IP breakout area, the network must inform the mobile terminal 150, 151 about neighboring LTE Cells in which the local IP breakout service may continue. The Network can indicate the list of neighboring Cells and Tracking Id in conjunction with an Initial Attach procedure, Network Entry to local breakout service, or in ordinary handover related measurement control from the LTE Base Station to the mobile terminal. Whether or not the local service area, i.e., the area where a local breakout service is available, is continuous within a geographical area is a matter of network planning by the operator.

In an embodiment, a serving base station 160 of a mobile terminal 150 is configured to provide the local breakout service to the Internet protocol gateway while retaining user access control and a remote Internet protocol gateway of a packet core network of the public mobile network for the mobile terminal; to provide information on neighboring cells in which the local breakout service can continue; to make a handover decision based on received measurement reports from the mobile terminal; and to transfer user context data including local breakout service related information to a target base station 162 to 165 during handover for providing mobility within the local breakout service area for the mobile terminal 150.

In an embodiment, means for providing intra local IP breakout area mobility in active mode, e.g. LTE_ACTIVE mode, in a radio system is provided. The local IP breakout area is limited geographically and thus, also mobility for local IP breakout services with session continuation is limited correspondingly (moving out of the local area requires IP address change). However, in an embodiment, this is an alternative service to the default user IP connectivity via the SAE Gateway that provides global roaming and mobility support and may be available in parallel.

The standard LTE/SAE procedures support active mode mobility only via one U-plane anchor (SAE GW) at a time. According to the standardized functional split this gateway is located in the Core Network either in the visited PLMN or at subscriber's home PLMN, i.e. far away from the mobile terminal 150 and its current LTE base station 160.

The 3GPP terminology defines APN (Access Point Name) that is an identifier for an IP point of attachment/SAE GW for the mobile terminal. In case the local IP breakout is activated the mobile terminal must use another IP point of attachment from a local IP Gateway in parallel with the SAE GW. This requires assigning another IP address/APN for the UE's network interface and if the ordinary IP Address/APN from the SAE GW will be used in parallel with this, it means that the mobile terminal and the LTE/SAE network must be capable to support IP multi-homing in terms of IETF (Internet Engineering Task Force).

From the network controlled mobility point of view, the local IP breakout requires to manage multiple data paths in the LTE base stations, i.e. one pointing to the SAE GW 108 and another to the local IP GW 170.

In an embodiment, the network guides the mobile terminal 150 by giving a list of neighboring cells in which the local IP Breakout Service can continue and these cells should be preferred in the inter Cell/LTE Base Station Handovers.

Embodiments are described that provide solutions for active mode, e.g. LTE_ACTIVE mode, mobility when the mobile terminal is using an ordinary IP Gateway (Access Router) for local IP breakout services from a base station, e.g. an LTE Base Station, while retaining user access control in the operator's packet core. It is assumed that the registration to the ordinary SAE Bearer services using an IP address from the SAE GW is available in parallel, even not necessarily used for active sessions.

The scope of IP connectivity via the local IP breakout service may be from one LTE Cell/Base Station to a wider area that is formed from multiple neighboring LTE Cells/Base Stations. It is assumed that a local IP breakout service related IP sessions are allowed to break when the mobile terminal 150 moves out of coverage area (e.g. no Client Mobile IP required).

In order to provide Intra local IP breakout service area mobility the following functions are required:

- The network should guide the mobile terminal by giving a list of neighboring Cells in which the local IP Breakout Service can be activated, or continue after activation. The local IP breakout service related Service Id, Service Type, Cell IDs, Tracking Area ID and Network ID could be indicated initially during the UE Network Entry procedure to a local IP breakout service and stored into the mobile terminal so that it is able to select and enter to a proper LTE Cell in cell re-selection situations e.g. after radio link failure, or in Idle (battery power saving state) to Active mode transitions.
- The activation of a local IP breakout service may occur in conjunction of UE Initial Attach procedure to the LTE/SAE Network assuming that the current LTE Cell belongs to a local breakout service area, or due to UE movement to a LTE Cell that provides a local breakout service either after Inter LTE Base Station handover, or Idle to Active transition.
- During an LTE_ACTIVE mode operation the LTE Base Station should control the ordinary handover measurements in the mobile terminal so that the neighboring cell list is updated to the mobile terminal taking its active local IP breakout service into account i.e. keeping higher priority for measuring the cells in which local breakout service can continue.
- In case the local IP breakout service may cover more LTE Cells than the mobile terminal can store in its memory at a time, the mobile terminal may be assisted by the network/LTE Base Station so that a proper set of LTE Cells IDs are available in the mobile terminal based on its movements in the area.
- The handover control algorithm for making the Inter Cell handover decisions in the LTE Base Station should keep higher priority for the cells in which local breakout service can continue even some other LTE cell in the neighborhood may provide better radio signal quality.
- The Source LTE Base Station may support user context transfer to the Target LTE Base Station during the Inter LTE Base Station handovers so that the local IP breakout service related information is included in the context data.
- Based on the received user context data the Target LTE Base Station is able to setup the required radio bearer service for the local IP breakout and for the default SAE bearer immediately after the mobile terminal has obtained radio link connectivity.
- Based on the received user context data the Target LTE Base Station is able to switch/update user-plane data paths both to the SAE GW and the Local IP Gateway after successful radio handover ("late path switching principle"). The user-plane towards the SAE GW may apply IP tunneling protocol, e.g. GTP (GPRS Tunneling Protocol), GRE or IP in IP that is controlled according to standard. The LTE Base Station may execute the required actions for controlling the local IP breakout data path in parallel to this.
- In case the LTE Base Station provides an integrated next hop router function for the local IP breakout service, i.e. it is itself the local IP Gateway then the mobility with IP session continuation is normally limited to LTE Cells within this LTE base Station (may provide multiple sectored Cells). Now the mobile terminal movement out of these Cells to another LTE Base Station would require changing the local IP Gateway and IP address when sessions using old IP address will break. This use case is suitable for providing a local IP breakout service from the subscriber's home either using a nearby LTE Base Station, or a cheap indoor Base Station and a fixed Broadband Internet connection e.g. DSL.
- Using Client Mobile IP (MIP) in the mobile terminal could expand the coverage of IP mobility when an LTE Base Station provides an integrated IP Router function. According to IETF specified MIP, the local IP address from the LTE Base Station becomes the Care-of Address (CoA) and the mobile terminal must assign the Home Address (HoA) from a Home Agent (HA) that provides the actual IP Gateway to the UE. With Mobile IP the sessions use HoA and mobile terminal movements from Router to another cause only CoA changes that do not break the IP sessions. In best the Client MIP could be transparent to the LTE Base Station. However, the router change detection without assistance from the link layer would make the CoA changes impossible, as the LTE radio does not provide the required broad- or multicasting of local router advertisements over radio link. Even delivery of router advertisement will be implemented in conjunction of inter LTE Base Station handovers (triggered from link layer activities) the breaks on user-plane connectivity at IP layer would be from hundreds milliseconds to seconds that would disturb the end-to-end IP services remarkably. In order to reduce break time below 50 milliseconds some Fast/Seamless Mobile IP handover mechanism may be applied.
- The IP mobility may be expanded to cover multiple Cells/LTE Base Stations by using an external next hop router as a local IP Gateway (Access Router) to which the LTE Base Stations that provide a local IP breakout service are connected using a L2 Switched Access Network technology, e.g. Ethernet LAN that forms a single IP subnet. Now the mobile terminal movement from LTE Base Station to another within the same LAN would require data path update only at link layer. The LTE Base Station may behave as a proxy to the mobile terminal towards the Ethernet LAN and performs Proxy ARP (with IPv4) or Proxy Neighbor Advertisement (IPv6) that update mobile terminal IP address and Link Layer Address mapping in the IP Gateway when required.
- The IP mobility may be expanded to cover multiple Cells/LTE Base Stations by using network controlled local IP mobility e.g. Proxy MIP Client in the LTE Base Station and an external IP Gateway (Access Router) supporting Home Agent (HA), or LMA (Local Mobility Agent) functionality. Now the gateway for the local IP breakout service can be selected behind multiple router hops in IP routed access network as user plane can be IP tunneled, so the service coverage area limit depends on just how high in the IP network topology the IP Gateway resides.

In an embodiment, means for intra local IP breakout area mobility in idle mode, e.g. LTE_IDLE mode in the LTE/SAE system, is provided. The local IP breakout services may have a limited coverage area and thus, overlapping Tracking Areas within the ordinary macro layer Tracking Areas (TAs) may be formed into the radio network topology in order to provide network controlled intra Local IP Breakout service area mobility.

The network may guide the mobile terminal by giving the TA Id and maybe a list of neighboring Cells in which the local IP Breakout Service can continue and the mobile terminal is able to use this information in Cell Re-Selection situations in idle mode, e.g. in LTE_IDLE mode, or in case of failures.

Currently, MME manages the Idle Mode, provides a Paging Agent and the SAE GW terminates the user plane when the mobile terminal is in Idle. The traffic for the Local IP Breakout Service does not traverse via the SAE GW, so a local Paging Agent function and user plane termination will be required in the network for the "local IP breakout" service in order to support Idle Mode. The mobile terminal should not have to separate Idle States for local and SAE bearer services in order to avoid complexity.

Embodiments are described that provide solutions for idle mode mobility, e.g. LTE_IDLE mode mobility, when a mobile terminal is using an ordinary IP Gateway (Access Router) for local IP breakout services directly from a LTE Base Station while retaining user access control in the LTE/SAE operator's packet core. It is assumed that the registration to the ordinary SAE Bearer services using an IP address from the SAE GW is available in parallel, even not necessarily used for active sessions.

In order to provide Intra local IP breakout service area mobility in idle mode the following functions may be required:

The LTE Cells/Base Stations (eNBs) in a Local IP Breakout Service Area may be arranged into an underlying Tracking Area (TA) that may overlap with the upper Macro Layer TA.

The activation of a local IP breakout service may occur in conjunction of UE Initial Attach procedure to the LTE/SAE Network assuming that the current LTE Cell belongs to a local breakout service area, or due to mobile terminal movement to a LTE Cell that provides a local breakout service either after Inter LTE Base Station handover, or Idle to Active transition.

The network may guide the mobile terminal about a Local IP Breakout Service area/availability by giving the related a Tracking Area Id and/or a list of neighboring Cells depending on the granularity how the service area will be indicated. Based on this information the mobile terminal is able to activate or continue to use the local IP Breakout service after its activation.

The local IP breakout service related information could be given initially to the mobile terminal during the UE Network Entry procedure to a local IP breakout service and stored into the mobile terminal so that it is able to select and enter to a proper LTE Cell in cell re-selection situations e.g. after radio link failure, or in Idle (battery power saving state) to Active mode transitions.

The "current serving LTE Base Station" may be responsible for controlling the mobile terminal so that it is kept aware of the Tracking Area Id and neighboring cells in which its activated local IP breakout service is available. In case a Local IP Breakout service is activated the serving eNB may create the related up-to-date Mobility Information that will be delivered to the mobile terminal in the RRC Connection release command upon Active to Idle State transition procedure.

In case the local IP breakout service may cover more LTE Cells than the mobile terminal can store in its memory, or handle at a time, the mobile terminal may be assisted by the network/LTE Base Station so that a proper set of LTE Cells IDs are always available in the mobile terminal based on its movements in the area.

The MME (Mobility Management Entity) node in the Core Network may provide a repository for the UE RAN User Context in LTE_IDLE and idle mode tunnel management towards the SAE GW according to the LTE/SAE specification. The LTE Base Station that is configured to provide a Local IP Breakout Service may include also the mobile terminal's local IP breakout service related information into the UE RAN Context data that will be stored in the MME while the mobile terminal is commanded to Idle State. This backup information could be used for failure recovery purposes in the MME.

The latest "serving LTE Base Station" may take the role of local Paging Agent when the mobile terminal is commanded into idle mode, e.g. LTE_IDLE, and stores the local IP breakout related UE context locally. It may also initiate a mobile terminal LBO (Local Breakout) Service Resource Retain timer in order to release the related resources also upon failure cases.

The data path for the local IP breakout may be retained in the latest "serving LTE Base Station" and the Local IP Gateway. The Paging Agent in the latest "serving Base Station may prepare to receive and buffer the user downlink IP data that is destined to the mobile terminal's local IP address. The eNB may refresh the lifetime of the PMIP tunnel or neighbor cache entry in the Local IP Gateway upon Active to Idle transition procedure.

The LTE Base Stations (eNBs) may send the LTE Cell System Information on their broadcast channel in order to let the mobile terminals to detect Cells in the operator's radio network. When the eNB is configured to support Local IP Breakout Service it may advertise in the Cell System Information also the local IP breakout service related information e.g. Service Id, Service Type, Cell Id, Tracking Area Id and Network Id among the other ordinary cellular operator's mobility information at Macro Layer.

The mobile terminal in LTE_IDLE mode may have a control algorithm for making the LTE Cell selections in order to keep higher priority for the cells in which local breakout service can continue even some other LTE cell in the neighborhood may provide better radio signal quality.

The mobile terminal in LTE_IDLE mode may perform the periodical Tracking Area (TA) Updates to the network (MME) indicating its reach ability within the local IP breakout service coverage area (LBO Info may be included into registration message). Now also the MME may re-start its LBO Service resource retain timer (continues time for storing the related user context) and also may send indication to the latest serving eNB/Paging Agent in order to continue LBO service retain time also there.

In case the mobile terminal in LTE_IDLE happens to move out of the Local IP Breakout Service area, it may initiate a Re-Entry timer for retaining local IP breakout service related resources and performs instant Tracking Area (TA) Update to the network (MME) indicating movement out of local IP breakout service coverage area. Upon reception of the LBO service lost information also the network (MME) may initiate a corresponding timer for retaining local IP breakout service related user context.

When the Re-Entry timers for retaining local IP breakout service will expire before the mobile terminal is able to obtain connectivity to LBO service, the mobile terminal and network nodes (MME and latest serving eNB/Paging Agent) may release all the related resources. From now on the mobile terminal must perform full Network Entry procedure to the LBO Service in case it happens to move back to the service coverage area.

The reception of a downlink packet that is destined to the mobile terminal's local IP address may trigger the "latest serving" LTE Base Station to perform UE paging via all the LTE Cells/eNBs that belong to the local IP breakout service area. UE Paging could be utilized e.g. by sending the paging command with mobile terminal Id and cause "LBO" over the X2 interface to the corresponding IP multicast group to which the neighboring eNBs are registered. Each eNB then sends the paging command over the radio interface that the mobile terminal may listen periodically while it is in Idle mode.

The mobile terminal may initiate movement from Idle to Active State (Network Re-Entry procedure) upon reception of a Paging Command (due to network originated session), or due to mobile terminal originated Session. In case the mobile terminal is set to monitor LBO service availability it may move from Idle to Active State in order to perform Network Entry procedure to a Local IP Breakout Service when service availability is detected.

The mobile terminal that has activated LBO service and makes the network Re-Entry due to Idle to Active transition, UE originated session, or after loosing radio link connectivity temporarily may indicate to the new eNB its mobile terminal Id and the latest serving eNB Id for the LBO service in order to let this new eNB to retrieve LBO related user context from the latest serving eNB/Paging Agent.

The latest serving eNB/Paging Agent may return the mobile terminal LBO service related context upon the request from the new eNB and initiates DL data forwarding to the new eNB (e.g. using IP tuneling). The buffered DL packets in the latest serving eNB/Paging Agent can be received in the new eNB and delivered to the mobile terminal using newly established radio link connection.

The mobile terminal that has activated LBO service and makes the network Re-Entry may indicate to the MME among other information also the Local Breakout Service related Identifier. The MME may have stored the LBO related user context for failure recovery purposes and is now able to deliver this information among other User Context that may be moved to the new eNB during the Network Re-Entry procedure according to the standard.

The MME may release the mobile terminal LBO service related resources in the latest serving eNB/Paging Agent using the S1 Connection Release procedure.

In an embodiment, the MME may provide the mobile terminal Idle Mode management for the SAE Bearer Services as usual and no other LTE Specific nodes except the LTE Base Stations are needed for LBO service implementation e.g. in Enterprise Networks. The mobile terminal is not required to maintain separated Idle modes both for SAE Bearer Services and Local IP Breakout Services. In an embodiment, the LTE Base Stations can provide the local Idle Mode management with a Paging Agent function and U-plane termination for the Local IP Breakout Services.

In an embodiment, paging can be handled at LTE Base Station level for the Local IP Breakout Service and the SAE Bearer Service level paging can work still in parallel from the MME. The latest serving eNB/Paging Agent is able to deliver paging command to all neighboring LTE Base Stations in the Local IP Breakout Service area over the X2 interface (no need to page via the MME).

It is not necessary to indicate to the mobile terminal whether paging is triggered due to local IP breakout service, or due to SAE Bearer Service as it is assumed that both services are moved to active state at the same time (SAE Bearer Services are available even not used actively).

In an embodiment, the mobile terminal is able to track Local IP Breakout Service availability during the Idle mode and to prefer Cells that provide continuation for the activated service.

An embodiment further provides recovery mechanisms in the mobile terminal and Network Nodes in case the mobile terminal happens to move out of the Local IP Breakout Service coverage area or in failure cases.

In an embodiment, identifiers are used to distinguish a public cell from a local cell that can be used by the eNodeB in the handover procedures or for any other reasons (e.g. performance indicators etc). In an embodiment, the neighbor cells reported by the UE may provide an explicit or implicit indication about the nature of the neighbor cell (private/local cell or public cell or any other type of cell that will be specified in the standards). A mobile terminal may, e.g. include 1 bit of information in the RRC: measurement report to indicate if the reported cell, identified with the "TM-Cell ID" is or not a public cell. E.g. bit "1" means public cell, bit "0" means private cell. The size of this indicator could be even longer in case there is a need to define other type of cells (e.g. public, corporate cell, home cell).

In an embodiment, the network management may indicate in its database if a cell under the operator's network is a home or private cell and use it during the handover decision algorithms. Similar as in the previous embodiment but the network management could indicate in its database if a specific cell belongs to a public cell or local/private cell. The indicator may be located in NMS (the Network management system). When a neighbor cell is reported by mobile terminal (including TA+cell identification), the eNodeB will contact NMS by using the TA+cell identification or any unique cell identifier reported by mobile terminal. The NMS will indicate to eNodeB about the type of cell (public or private).

This enables using the same TA for private and public cells which means easy network planning as then home cells could be deployed in any part of the operator's territory. In addition the mobile terminal would not need to generate signaling to the core network (tracking area update) when the mobile terminal moves between public and private cells using the same TA. Further, the eNodeB can use the private cell information in its handover algorithms to favor the handover to private cells as soon as possible. If the cell type if provided by the mobile terminal, then it would not be needed consultation in the OMS (O&M system). This can be useful for example in a multi-vendor scenario where different networks use different OMS elements.

In an embodiment, "cell type" information from neighbor and serving cells are used to support the handover decision.

According to the cell types available in E-UTRAN, e.g., public cell/private cell, the handover algorithm can include the following condition:

IF (neighbor cell=private cell registered by UE) and (minimum radio conditions are met) THEN->Execute a handover to the private cell.

If several private cells are reported as neighbor cells, the one with the best radio conditions or with highest priority may be chosen.

By involving the cell type during the handover process, the operator is able to prioritize the handover to private cells even if this is not the best neighbor cell in terms of radio conditions. This brings also less load in the public network. On the other side, user is able to connect to its private network as soon as possible, and save money as the access to public networks will be more expensive than accessing the private network.

In an embodiment, an operator is able to configure if the reporting of private/local cells which are not registered in the mobile terminal should or should not be reported to the network as part of the measurement reports in dedicated mode. Network commands mobile terminal to report or not report a private cell not registered by the terminal. This command can be sent during system information (broadcast channel) or during signaling in dedicated mode.

As a default procedure the mobile terminal may not report the unregistered private cells to network, after all, network will not execute handovers to those cells. However, for performance or planning purposes operator can enable this reporting in order to identify which other private cells are surrounding the serving cell and what is the level of interference of them. According to this information the operator can take different actions: mitigate interference between different private cells by e.g. changing the frequency carrier of the interferer cells.

Figure 2:
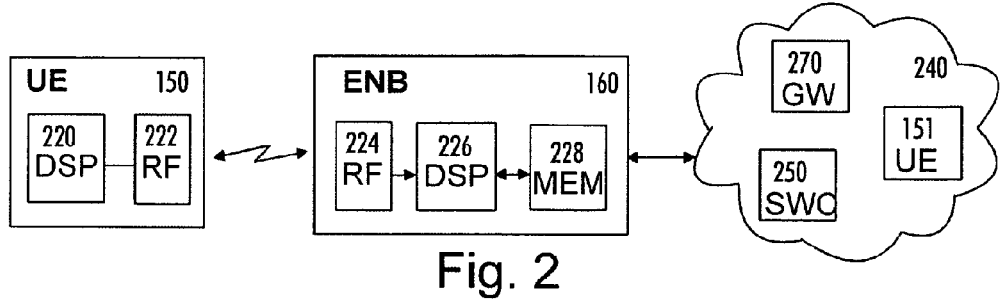
FIG. 2 is a block diagram of an example of a mobile terminal, a base station, and an IP subnet.

FIG. 2 illustrates an example of a mobile terminal, a base station, and an IP subnet. The mobile terminal 150 includes a communication unit 222 configured to communicate with one or more base stations 160 of a public mobile network, and a processing unit 220 for controlling the functions of the mobile terminal. The processing unit 220 is typically implemented with a microprocessor, a signal processor or separate components and associated software. The mobile terminal 150 further includes (e.g. in the processing unit 220): a detection unit configured to detect availability of a local breakout service to an Internet protocol gateway 270; a processing unit configured to start a network entry to the local breakout service; and a configuration unit configured to configure an Internet protocol stack of the mobile terminal on the basis of received configuration data in order to enter the local breakout service to the Internet protocol gateway while retaining user access control and a remote Internet protocol gateway of a packet core network of the public mobile network for the mobile terminal.

The base station 160 of a public mobile network has a communication unit 224 configured to communicate with at least one mobile terminal 150, and with a local breakout service network 240 providing Internet protocol gateway services. The base station further includes a detection unit configured to receive a network entry request to the local breakout service from the at least one mobile terminal 150; a processing unit configured to establish a radio bearer for the local breakout service; a mapping unit configured to provide a dynamic host control protocol relay function for mapping data of the mobile terminal using a local Internet protocol address to the established radio bearer; and a processing unit configured to provide the local breakout service to the Internet protocol gateway while retaining user access control and a remote Internet protocol gateway of a packet core network of the public mobile network for the mobile terminal.

The base station 160 is further configured: to provide information on neighboring cells in which the local breakout service can continue; to make a handover decision based on received measurement reports from the mobile terminal; and to transfer user context data including local breakout service related information to a target base station during handover for providing mobility within the local breakout service area for the mobile terminal 150. The processing unit 226 is typically implemented with a microprocessor, a signal processor or separate components and associated software. The base station 160 may also include a memory 228 and other elements.

The local breakout service can be provided, for example, to a local network 240 that enables direct UE-to-UE (between 150 and 151) communications, UE-to-local servers and an Internet connection (direct routing). The local network 240 can be, for example, an enterprise network, a shopping center, a city center, a gaming zone, municipal services, a base station sharing with a local operator, a home cell (nearby the base station), an indoor "Femto eNB" at home. The mobile terminal 150 is able to use a local IP address for direct IP connectivity from the base stations to the Internet, enterprise networks, regional or direct UE to UE services. No cellular operator owned special Gateway nodes are required in $3^{rd}$ party premises. Existing packet switched transport equipment, such as IP Routers and LAN Switches 250 and IETF compliant Servers, can be applicable.

In an embodiment, a local DHCP server can be used to assign a local IP address for the mobile terminal 150. The base station 160 may itself serve as the next hop router to the mobile terminal, or use the router next to the base station 160, or an IP Gateway behind multiple router hops. Further, inter-base station mobility within the local breakout service coverage area can be supported without changing the local IP address.

Figure 17:
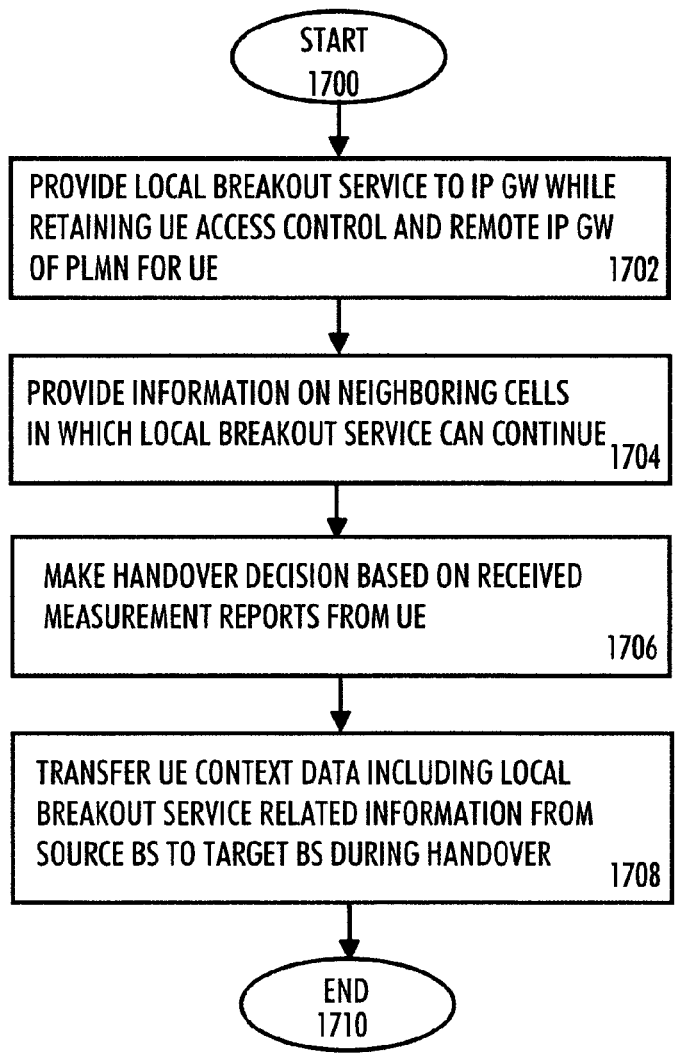
FIG. 17 shows an example of a method according to an embodiment.

The FIG. 17 shows an example of a method according to an embodiment. The method starts in 1700. In 1702, a local breakout service is provided to an Internet protocol gateway while retaining user access control and a remote Internet protocol gateway of a packet core network of a public mobile network for a mobile terminal. In 1704, information on neighboring cells in which the local breakout service can continue is provided. In 1706, a handover decision is made based on received measurement reports from the mobile terminal. In 1708, user context data including local breakout service related information is transferred from a source base station to a target base station during handover for providing mobility within the local breakout service area for the mobile terminal. The method ends in 1710.

The embodiments may be realized in an electronic device having a controller. The controller may be configured to perform at least some of the operations described in connection with the flowchart of FIG. 5 and in connection with FIGS. 1 to 4. The embodiments may be implemented as a computer program containing instructions for executing a computer process. The computer process includes detecting availability of a local breakout service to an Internet protocol gateway for a mobile terminal in a public mobile network; starting a network entry of the mobile terminal to the local breakout service; establishing a radio bearer for the local breakout service; providing a dynamic host control protocol relay function for mapping data of the mobile terminal using a local Internet protocol address to the established radio bearer; configuring an Internet protocol stack of the mobile terminal on the basis of received configuration data; and providing the local breakout service to the Internet protocol gateway while retaining user access control and a remote Internet protocol gateway of a packet core network of the public mobile network for the mobile terminal.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

The following two chapters describe embodiments of intra Local IP Breakout service in LTE/SAE networks. The first chapter describes embodiments of active mode mobility, and the second chapter describes embodiments of idle mode mobility:

1 Intra Local IP Breakout Service Area Active Mode Mobility in LTE/SAE Networks

The LTE/SAE applies network controlled and mobile terminal assisted handover principle in normal situations when Inter Cell/LTE Base Station handover can be prepared in advance. The handover preparation involves neighboring cell signal quality measurements in the mobile terminal, which the LTE Base Station may control by giving/updating the neighboring cell list to the mobile terminal. Now the LTE Base Station may take mobile terminal's local IP breakout service into account e.g. by keeping higher priority for measuring the cells in which local breakout service can continue and give a list of neighboring Cells in which the local IP Breakout Service can continue.

In case the local IP breakout service may cover more LTE Cells than the mobile terminal can store in its memory at a time, the mobile terminal may be assisted by the network/LTE Base Station so that a proper set of LTE Cells IDs are available in the mobile terminal based on its movements in the area.

The handover control algorithm for making the Inter Cell handover decisions in the LTE Base Station should keep higher priority for the cells in which local breakout service can continue even some other LTE cell in the neighborhood may provide better radio signal quality.

1.1 Intra LTE Base Station Handovers with Local IP Breakout Services

The Intra LTE Base Station handovers are actually Inter Cell handovers within one Base Station node. The trigger for Inter Cell handover is always network controlled in the LTE/SAE system. The LTE Base Station is responsible for making the handover decisions based on the neighboring cell signal quality measurements that it receives from the mobile terminal. The LTE Base Station must be able to control the measurements in the mobile terminal so that the neighboring cell list is updated to the mobile terminal by taking the local IP breakout service into account, i.e. keeping higher priority for measuring the cells in which local breakout service can continue.

A LTE Base Station (eNB, eNodeB) contains typically several Cells that each can serve mobile terminals in individual and adjacent sectors in the neighborhood of the Base Station. This is done by directioning the antennas in order to have the desired coverage for the network services.

The coverage area of the cells belonging to the same LTE Base Station may form a "micro-mobility area" in which mobility can be handled using Intra LTE Base Station Handovers.

The Inter-Cell handovers within the same Base Station node are never visible outside of its access network interface from the user-plane connectivity point of view as only radio handover and node internal routing is needed.

In case the LTE Base Station provides an integrated next hop router function for the local IP breakout service i.e. it is itself the local IP Gateway then IP session continuation can be maintained in Intra LTE base Station handovers. Now the mobile terminal movement out of radio coverage area of the LTE Base Station to another LTE Base Station would require changing the local IP Gateway and IP address when sessions using the current local IP address will break.

In spite of its limited IP mobility the local IP breakout service area that covers just one LTE Base Station could be applicable as subscriber's Home Base Station either using a nearby LTE Base Station, or a cheap indoor Base Station and a fixed Broadband Internet connection e.g. DSL. Also a public hot spot could be implemented with one LTE Base Station.

1.2 Inter LTE Base Station Handover with Local IP Breakout Services in L2 Switched Networks In order to expand local IP breakout service area, it may be feasible to connect multiple LTE Base Stations in local neighborhood to the same logical LAN/IP subnet including a L2 Switched Network. Now the Access Router (IP Gateway) that connects the external IP Routed networks to this logical LAN/IP subnet may provide the IP point of attachment to mobile terminals that will use the local IP breakout service in this area. The movements of the mobile terminal within this expanded local IP breakout service area may utilize only link layer mobility, and thus IP session continuation can be maintained as long as the mobile terminal remains within the coverage area of these LTE Cells/Base Stations. On the user-plane there is no need for IP tunneling as the LTE Base Stations and IP Gateway reside in the topologically correct IP subnet/link.

Figure 3A:
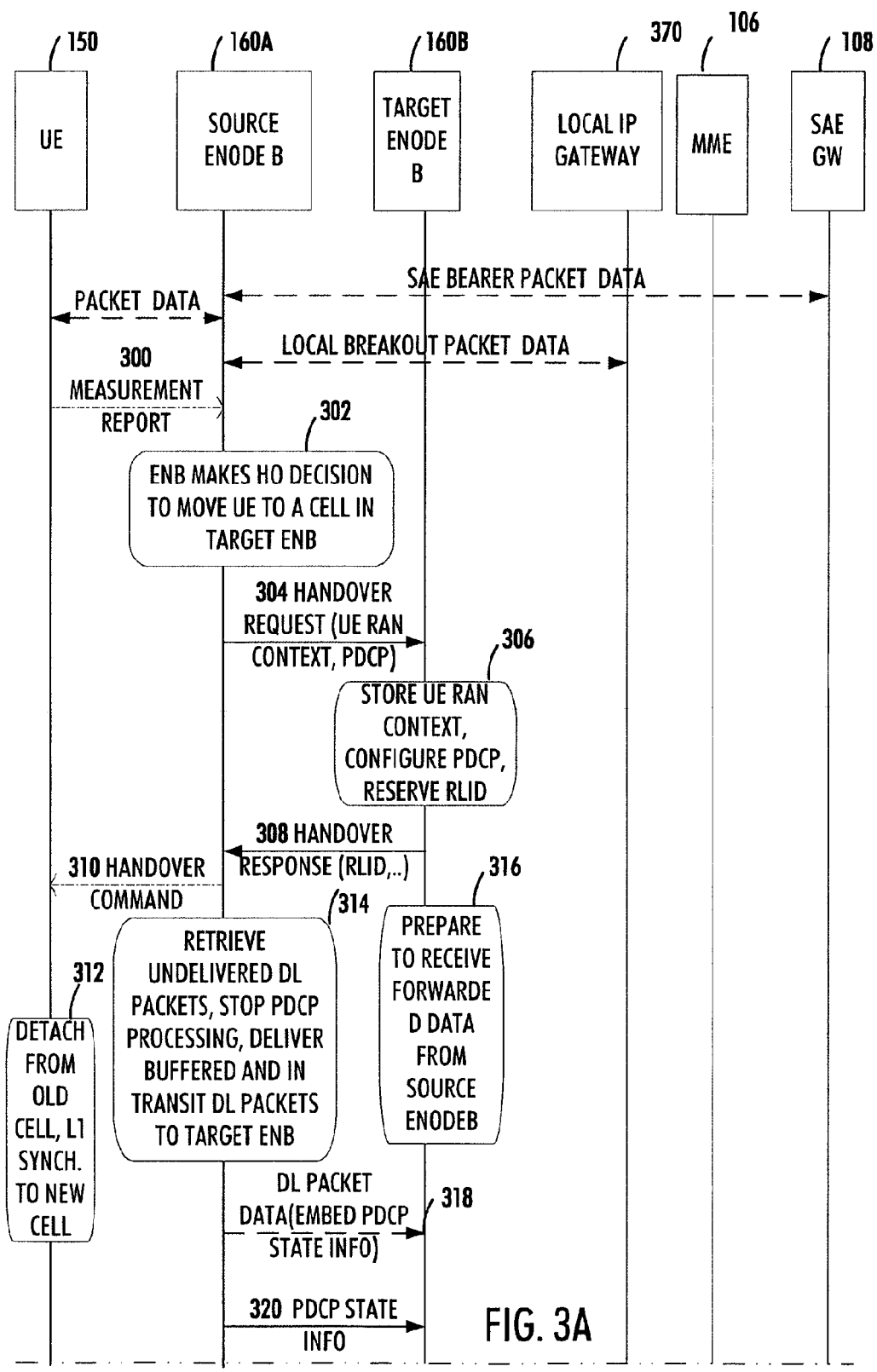
FIGS. 3A and 3B are a signal sequence diagram illustrating an example of providing intra local IP breakout service area active mode mobility.
Figure 3B:
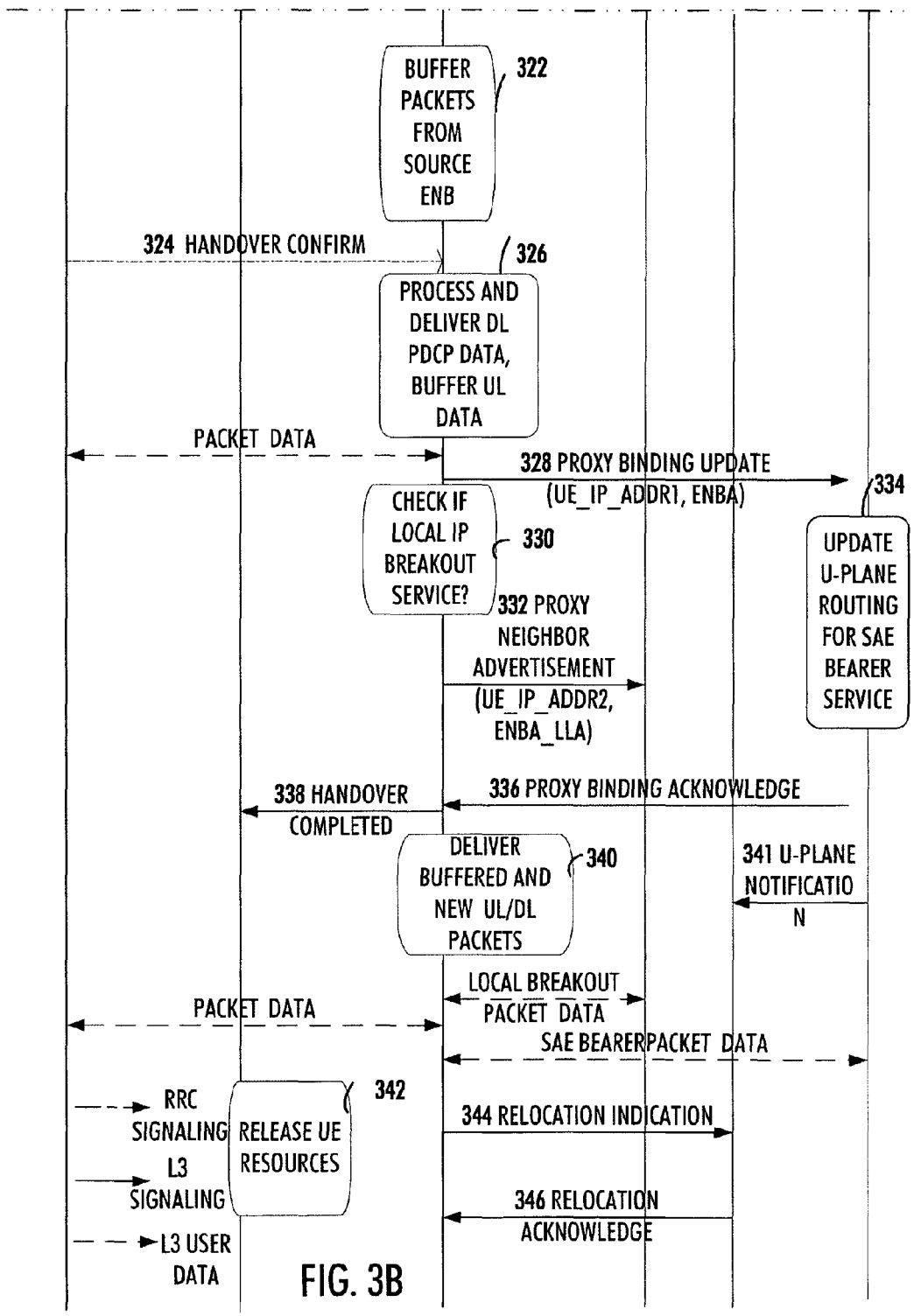

The FIG. 3 shows an example of the Inter LTE Base Station handover according to the current 3GPP RAN WG3 working assumption except the PDCP function is located in the LTE Base Station and the required functions for local IP breakout services in case the IP Gateway is interconnected to LTE Base Station(s) using a L2 Switched Network and a local IP breakout service is active for the mobile terminal.

FIG. 3 is a signal sequence diagram illustrating an example of a method of providing intra local IP breakout service area active mode mobility in an LTE/SAE network. A detailed signaling flow of inter-LTE base station handover with local IP breakout services in L2 switched network is described.

In 300 and 302, the LTE Base Station (eNode B) 160A where the mobile terminal 150 is connected makes a handover decision to a new (target) Cell located at Target eNode B 160B based on the received measurement report(s) from the mobile terminal 150 by keeping higher priority for the cells in which local breakout service can continue.

In 304, the Source eNodeB 160A sends the Handover Request message to the Target eNodeB 160B that contains the user context data, e.g. User identifiers/addresses, security, QoS/bearer/services data, PDCP state etc. The Target BS 160B may create the user context, reserve required radio resources and makes the required configurations in 306.

In 308, the Target eNodeB 160B responds with the Handover Response message that contains the allocated radio resource information for establishing radio link connectivity quickly in the target Cell.

In 310, the Source eNodeB 160A sends the Handover Command message to the mobile terminal 150 containing the target Cell Id and given radio resource information. Upon reception of this command the mobile terminal may detach from the source Cell 160A and synchronizes to the target Cell 160B at L1 (physical layer radio connection) in 312. In order to provide a lossless handover at user end-to-end service layer, the source eNodeB 160A stops PDCP processing, resolves the PDCP Sequence number of the last fully transmitted IP packet in downlink, starts forwarding the IP packets in downlink buffer and the arriving in transient packets to the Target eNodeB 160B in 314. The source eNodeB 160A may indicate the PDCP Sequence number for the 1st forwarded downlink IP packet either embedded into IP tunneled (capsulated) user plane packet (e.g. in tunneling protocol header), or given in a PDCP State Info message on control plane in 318 to 320. The Target eNodeB 160B prepares to receive forwarded data from the source eNodeB 160A in 316. In 322, the Target eNodeB 1606 may decapsulate and buffer the forwarded downlink packet(s) and store the received PDCP Sequence number.

In 324, the mobile terminal 150 synchronizes to the target Cell over radio link and sends the Handover Confirm to the Target LTE Base Station that contains the required mobile terminal Identifiers, addresses and security info. Now the target eNodeB 160B is able to transmit user downlink packets to the mobile terminal 150 so that PDCP processing starts seamlessly from the point it ended in the source eNodeB 160A. Also the mobile terminal is able to send uplink data on user plane that the Target eNodeB 160B may buffer so far. In 326, the Target eNodeB 1606 processes and delivers DL PDCP data, buffer UL data.

In 328, the Target eNodeB 160B sends the Proxy Binding Update message to the SAE GW 108 in order to switch the SAE Bearer data path to the Target eNodeB 1608 (note, also other protocol than PMIP could be applied for data path management e.g. GTP-C).

In 330, the Target eNodeB 1606 checks if a local IP breakout service is active and detects that the Local IP Gateway is the "next hop router" to the Target eNodeB 160B, i.e. resides in the same L2 Switched network/IP subnet as the eNodeB itself. In 332, the eNodeB 160B sends a Proxy Neighbor Advertisement (ordinary ICMPv6 Neighbor Advertisement, or ARP message in case of IPv4) message to the Local IP Gateway 370 (ordinary IP Access Router) as being a proxy to the mobile terminal 150 at link layer. This will update the mobile terminal's IP Address binding to the current eNodeB's Link Layer Address in the neighbor cache of the Access Router. From now on the new downlink IP packets to the mobile terminal 150 that are for the local IP breakout service will arrive to the Target BS encapsulated into L2 Frames (e.g. Ethernet Frames) that are destined to eNodeB's link layer address (e.g. Ethernet MAC address). The uplink packets from the mobile terminal 150 that are for the local IP breakout service may traverse automatically from eNodeB to the default gateway (Local IP Gateway).

In 336, the SAE GW 108 responds with a Proxy Binding Acknowledge message to the Target eNodeB 160B indicating that the SAE Bearer data path is switched successfully in 334. From now on the eNodeB is able to deliver the SAE Bearer related uplink packets to the SAE GW 108 using the newly setup IP tunnel (GRE, GTP etc.) and to receive SAE Bearer related downlink packets from the SAE GW 108 and to forward those to the mobile terminal 150 over the radio link.

In 338, the Target eNodeB 160B sends the Handover Complete message to the Source eNodeB 160A indicating that the mobile terminal 150 has moved successfully to the Target Cell/Base Station. Now the Source eNodeB 160A is able to release all the mobile terminal 150 related resources in 342. This may be considered the point where the radio handover is fully completed.

In 340, the Target eNodeB 160B delivers buffered and new UUDL packets. In 341, the SAE GW 108 sends a U-Plane notification to the MME 106 in order to indicate successful SAE Bearer data path switching.

In 344, the Target eNodeB 160B sends a Relocation Indication message to the MME 106 that indicates mobile terminal movement to the Target Cell/eNodeB 160B. In 346, the MME 106 responds with a Relocation Acknowledge message to the Target eNodeB 160B.

1.3 Inter LTE Base Station Handover with Local IP Breakout Services in IP Routed Networks In order to expand local IP breakout service area larger, it may be feasible to connect multiple LTE Base Stations in local neighborhood to a Local IP Gateway (ordinary IP Access Router supporting IP Mobility) that is behind multiple router hops from the Base Stations. The Access Router (IP Gateway) may provide the IP point of attachment to mobile terminals that will use the local IP breakout service in this area. The mobile terminal movements within this expanded local IP breakout service area may utilize a Network Controlled Localized IP layer Mobility and IP tunneling between the LTE Base Stations and the Local IP Gateway (Base Stations are no more in the topologically correct IP subnet/link). These enable IP session continuation as long as the mobile terminal remains within the coverage area of these LTE Cells/Base Stations.

Figure 4A:
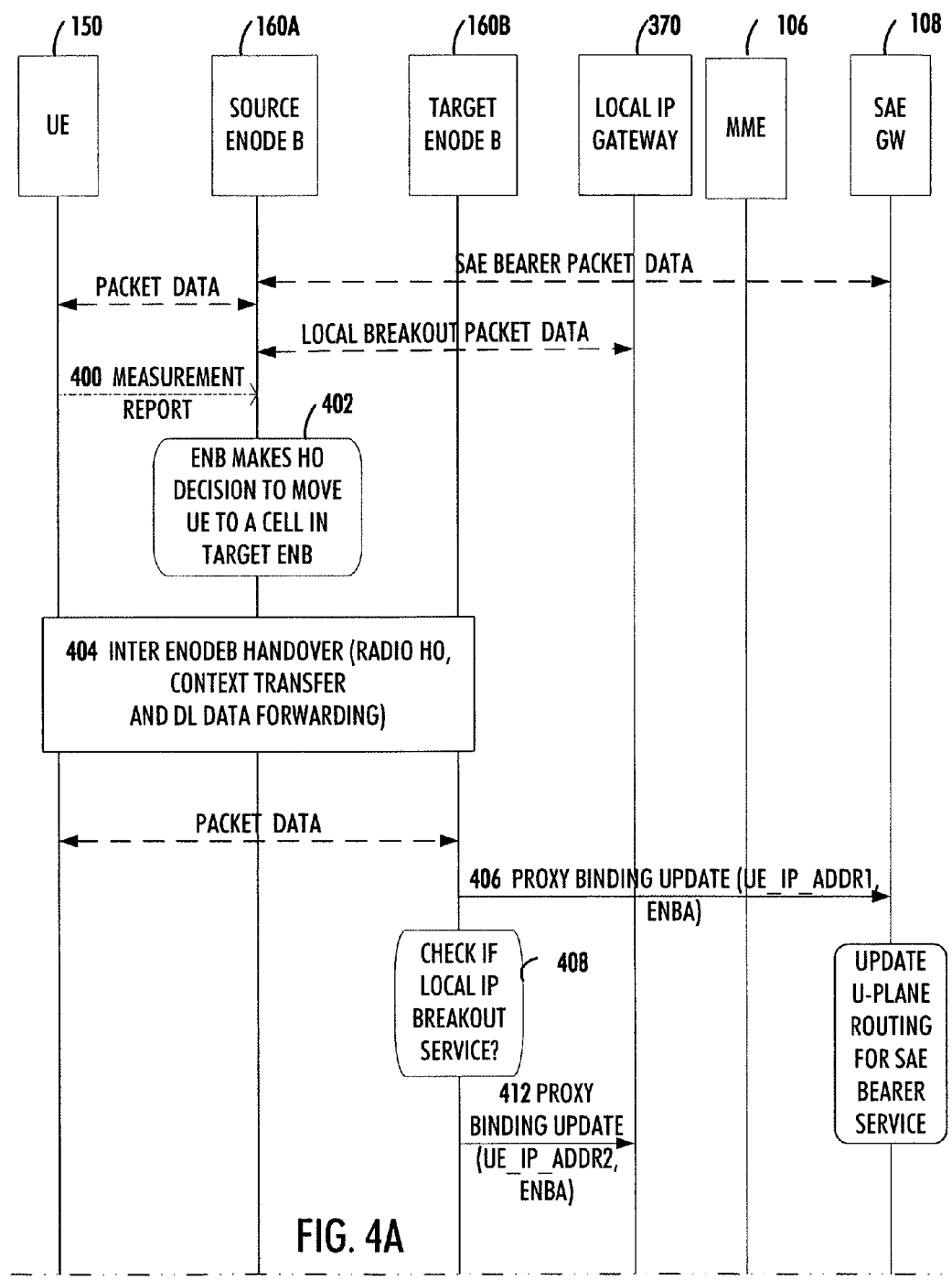
FIGS. 4A and 4B are a signal sequence diagram illustrating an example of providing inter base station handover with local IP breakout service.
Figure 4B:
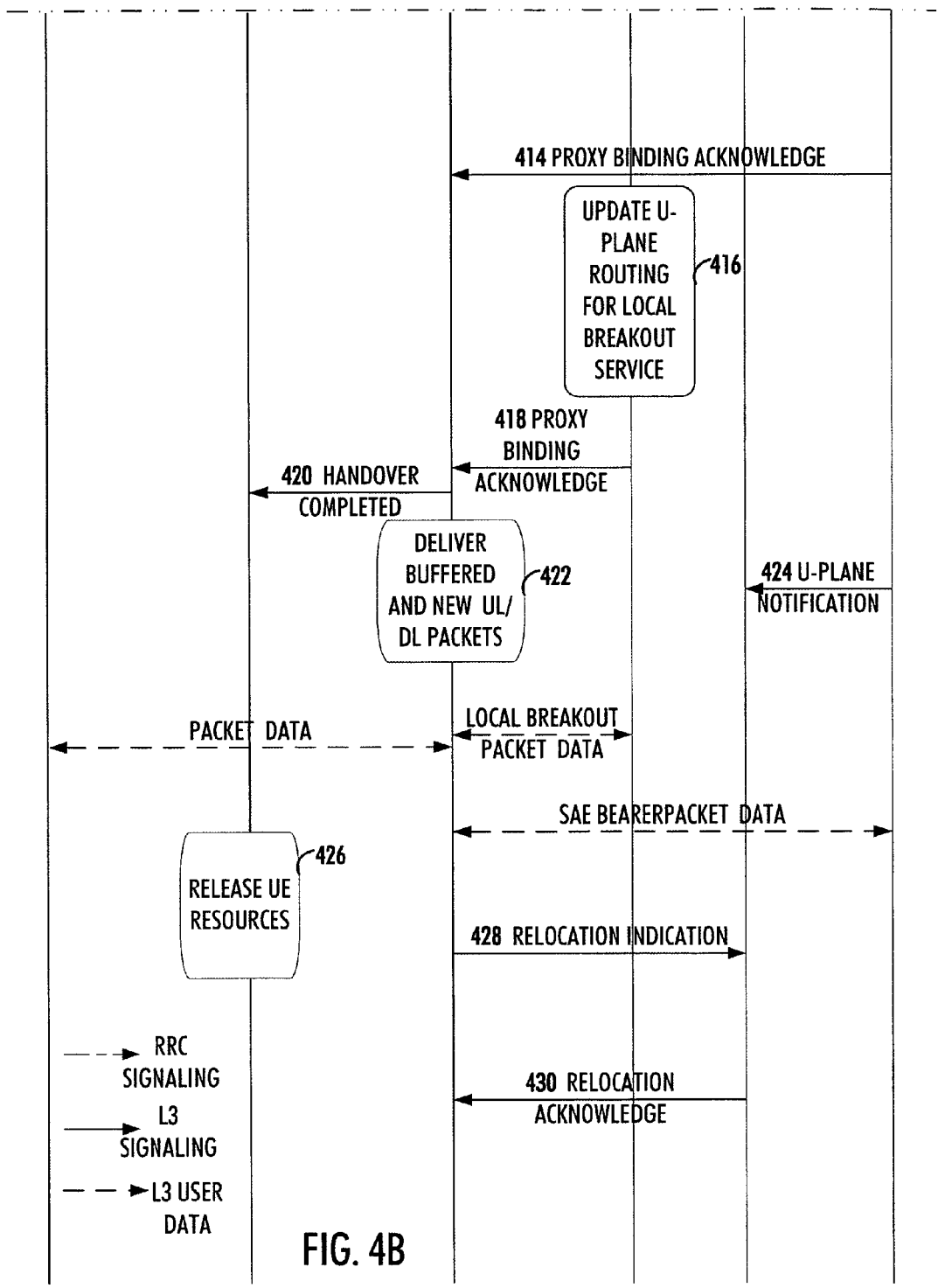

The FIG. 4 shows an example of the Inter LTE Base Station handover according to the current 3GPP RAN WG3 working assumption except the PDCP function is located in the LTE Base Station and the required functions for local IP breakout services in case the IP Gateway is interconnected to LTE Base Station(s) using an IP Routed Network and a local IP breakout service is active for the mobile terminal 150.

In 400 and 402, the LTE Base Station (eNode B) 160A where the mobile terminal 150 is connected makes handover decision to a new (target) Cell located at Target eNodeB 160B based on the received measurement report(s) from the mobile terminal by keeping higher priority for the cells in which local breakout service can continue.

In 404, the Source eNodeB 160A and the Target eNodeB prepare the Inter eNodeB handover with context transfer, resource reservation after which the mobile terminal 150 is commanded to execute radio handover. A lossless handover at end-to-end u-plane services is achieved by using downlink user data forwarding from the Source eNodeB 160A and the Target eNodeB 160B (see the previous signaling flow of FIG. 3 showing the details).

In 406, when the mobile terminal 150 has obtained radio link connectivity, the Target eNodeB 160B sends the Proxy Binding Update message to the SAE GW 108 in order to switch the SAE Bearer data path to the Target eNodeB 160B (note, also other protocol than PMIP could be applied for data path management e.g. GTP-C).

In 408, the Target eNodeB 160B checks if a local IP breakout service is active and detects that the Local IP Gateway is not the "next hop router" to the Target eNodeB 160B, i.e. resides in different IP subnet/link than the eNodeB itself. In 412, the eNodeB 160B sends a Proxy Binding Update message to the Local IP Gateway 370 (ordinary IP Access Router) as being a proxy to the mobile terminal 150 at IP layer. This will update the mobile terminal's IP Address binding to the current eNodeB's IP Address in the Access Router.

In 414, the SAE GW 108 responds with a Proxy Binding Acknowledge message to the Target eNodeB 160B indicating that the SAE Bearer data path is switched successfully. From now on the eNodeB is able to deliver the SAE Bearer related uplink packets to the SAE GW 108 using the newly setup IP tunnel (GRE, GTP etc.) and to receive SAE Bearer related downlink packets from the SAE GW 108 and to forward those to the mobile terminal 150 over the radio link. In 416, the Local IP Gateway 370 updates U-Plane routing for Local Breakout services.

In 418, the Local IP Gateway 370 responds with a Proxy Binding Acknowledge message to the Target eNodeB 160B indicating that the local IP breakout data path is switched successfully. From now on the eNode B is able to deliver the local IP breakout related uplink packets to the Local IP Gateway using the newly setup IP tunnel (GRE, IP in IP etc.) and to receive local IP breakout related downlink packets from the Local IP Gateway 370 and to forward those to the mobile terminal 150 over the radio link. From now on the new downlink IP packets to the mobile terminal that are for the local IP breakout service will arrive to the Target BS encapsulated into IP tunneled packets that are destined to eNodeB's IP address (IP tunnel endpoint address in eNodeB). The uplink packets from the mobile terminal 150 that are for the local IP breakout service may be IP tunneled from the eNodeB to the Local IP Gateway correspondingly.

In 420, the Target eNodeB 160B sends the Handover Complete message to the Source eNodeB 160A indicating that the mobile terminal 150 has moved successfully to the Target Cell/Base Station 160B. Now the Source eNodeB 160A is able to release all the mobile terminal 150 related resources in 426. This may be considered the point where the radio handover is fully completed. In 422, the Target eNodeB 160B delivers buffered and new UUDL packets.

In 424, the SAE GW 108 sends a U-Plane notification to the MME 106 in order to indicate successful SAE Bearer data path switching.

In 428, the Target eNodeB 160B sends a Relocation Indication message to the MME 106 that indicates mobile terminal movement to the Target Cell/eNodeB 160B.

In 430, the MME 106 responds with a Relocation Acknowledge message to the Target eNodeB 160B.

1.4 Mobile Terminal Network Entry to Local IP Breakout Service after Inter eNodeB Handover The mobile terminal may move to a Local IP Breakout Service Area as a result of an Inter LTE Base Station (eNodeB) handover. The availability of the local breakout service in the mobile terminal's current LTE Cell/Base Station could be indicated to the mobile terminal by one of the following:

Advertisements in the LTE Cell System Information from the Base Station (configured into LTE Cell/Base Station Radio Network Conf data). The mobile terminal may store this information while receiving Cell System Information during neighboring Cell signal quality measurements.

Indicating the local breakout service availability to the mobile terminal in NAS signaling when mobile terminal has moved to service coverage area, e.g. triggered from inter LTE Base Station Handover (location based service triggered from the Evolved Packet Core).

Mobile terminal itself detects movement to LTE Cell in which Cell Id, Tracking Area Id and Network Id match with the stored information in non-volatile memory of the mobile terminal.

User intervention from application level when the end-user is e.g. at the office (manual registration into Enterprise Network).

Figure 5A:
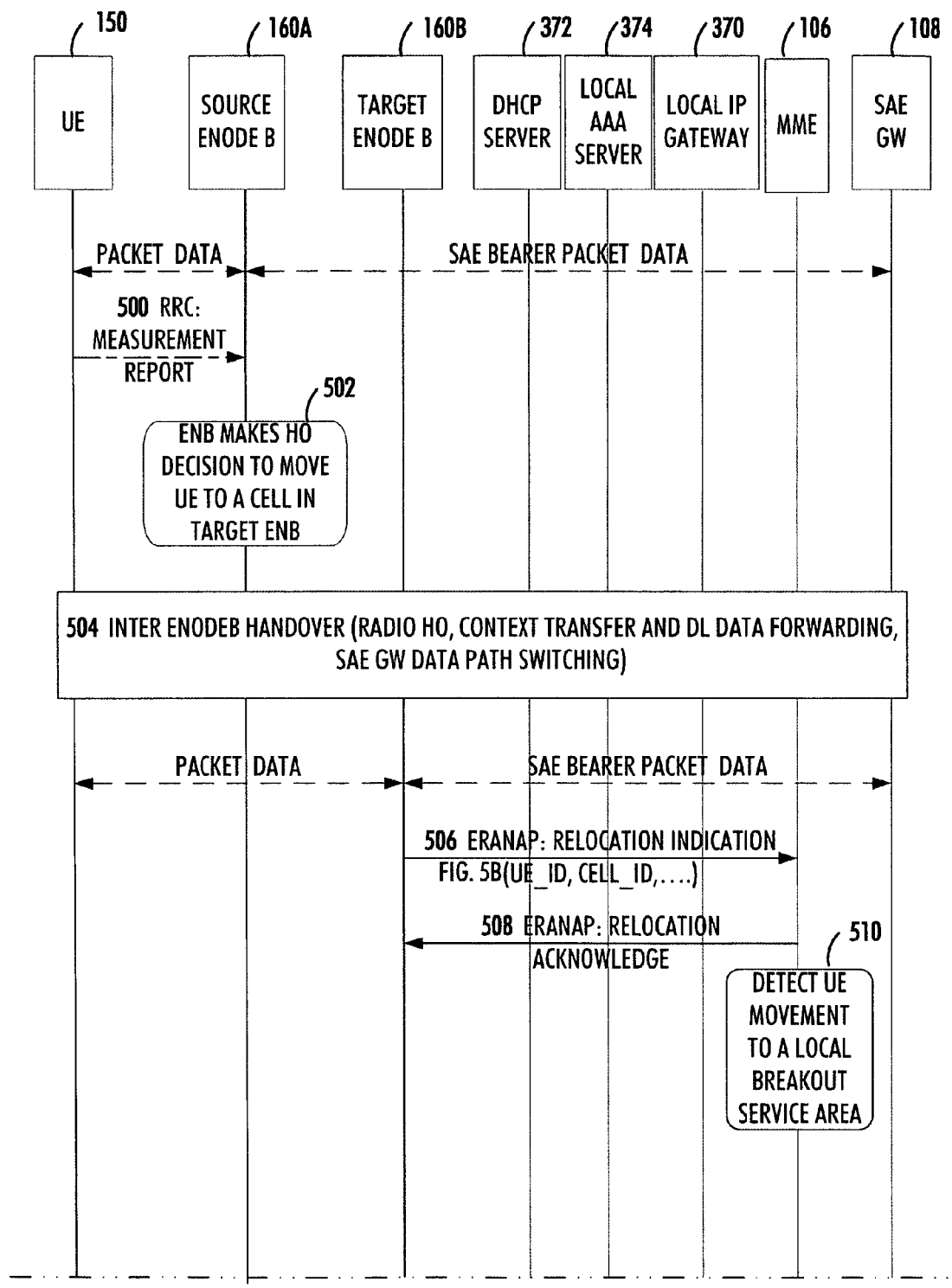
FIGS. 5A and 5B are a signal sequence diagram illustrating an example of providing UE network entry to local IP breakout service after inter base station handover.
Figure 5B:
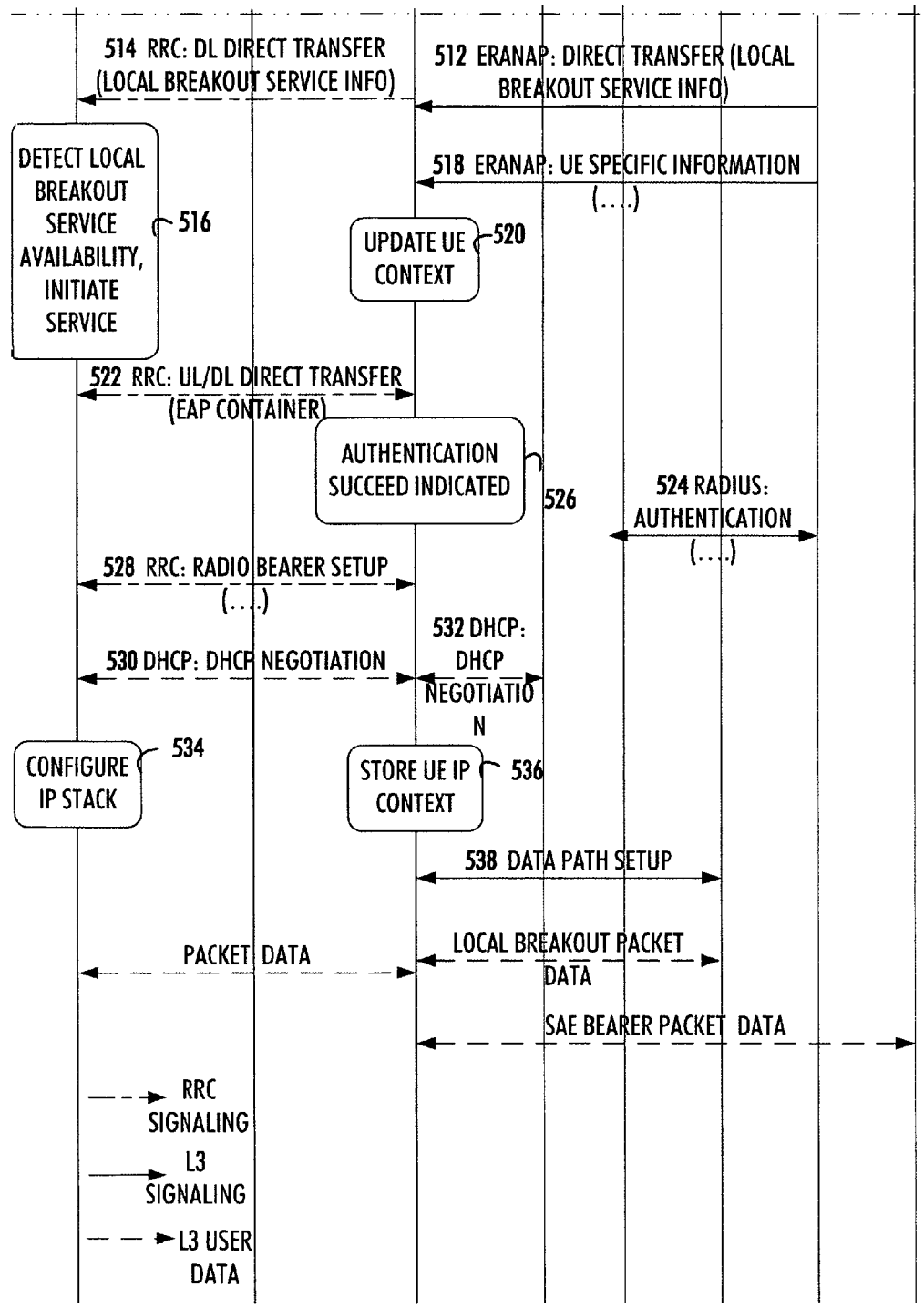

The signaling flow diagram in FIG. 5 illustrates an Inter LTE Base Station handover to a LTE Cell/Base Station that provides a Local IP Breakout Service. After the handover the User/mobile terminal receives the indication about service availability and the network entry procedure to a local IP breakout service may be started either automatically from the mobile terminal, or manually by the end-user intervention.

In 500 and 502, the LTE Base Station 160A (Source eNode B) where the mobile terminal 150 is connected makes handover decision to a new (target) Cell located at Target eNodeB 160B based on the received measurement report(s) from the mobile terminal 150 (Note, now it is assumed that a local IP breakout service is not available via the source eNodeB).

In 504, the Source eNodeB 160A and the Target eNodeB 160B prepare the Inter eNodeB handover with context transfer, resource reservation after which the mobile terminal 150 is commanded to execute radio handover. A lossless handover at end-to-end u-plane services is achieved by using downlink user data forwarding from the Source eNodeB 160A and the Target eNodeB 160B and the data path for the SAE Bearer Services is updated from the Target eNodeB 160A to the SAE GW 108.

In 506, the Target eNodeB 160B sends a Relocation Indication message to the MME 106 that indicates mobile terminal 150 movement to the Target Cell/eNodeB 160B. In 508, the MME 106 responds with a Relocation Acknowledge message to the Target eNodeB 160B.

In 510, the MME 106 may detect that the mobile terminal 150 has moved to Local IP Breakout coverage area and sends a NAS (Non Access Stratum) level message to the mobile terminal 150 containing the Local Breakout Service Info in 512. This is transported to the Target eNodeB 160B in a transparent container enclosed into a Direct Transfer message using eRANAP protocol.

In 514, the Target eNodeB 160B forwards the received transparent container to the mobile terminal 150 over the radio link enclosed into a DL Direct Transfer message using RRC protocol.

In 518, the MME 106 may send the mobile terminal Specific Information message to the Target eNodeB 160B that contains mobile terminal subscription related information about the local IP breakout service to the Target eNodeB 160B, e.g. Username/Password for authentication to a local breakout service. In 520, the Target eNodeB 160B updates UE Context.

In 516, 522 and 524, the User/mobile terminal has detected the availability of the service and initiates the UE Network Entry procedure to local IP breakout service that starts with optional authentication via a local AAA server 374 (required only in case the authentication to the LTE/SAE network is not trusted).

After successful local authentication in 526, the Target eNodeB 160B may setup required user context and a Radio Bearer for the Local IP Breakout Service that differentiates user data traffic from the default LTE/SAE bearer services in 528.

In 530 and 532, in case the mobile terminal 150 has not received IP address for the local IP breakout service already during the local authentication procedure, it obtains IP address for the local IP breakout service e.g. from a local DHCP Server 372 using the DHCP protocol. The eNodeB may provide a DHCP relay function when it is able to read and store the related IP configuration data into the mobile terminal IP context in 536. The mobile terminal configures its IP Stack with the received IP address and network configuration settings in 534.

In 538, the Target eNodeB 160B may setup data path to the Local IP Gateway for the local IP Breakout Service.

2 Intra Local IP Breakout Service Area Idle Mode Mobility in LTE/SAE Networks

Next some detailed principles and signaling flows for Intra Local IP Break Service Area mobility when the mobile terminal is in LTE_IDLE mode in the LTE/SAE Networks are described.

The cellular networks are built of radio cells that altogether form the radio network topology and provide service coverage for cellular mobile terminals i.e. user equipment (UEs). The LTE Base Stations (eNB) may have one or more LTE Cells that each has a certain radio coverage area. Neighboring and adjacent LTE Cells in a certain geographical area are grouped into Tracking Areas. The nation wide cellular operator's radio network may consist of multiple tracking areas.

The mobile terminal's current location can be tracked Based on Cell Ids and Tracking Area Ids and the network is able to guide and control mobile terminal movements from the eNBs and the MME (Mobility Management Entity).

The eNBs are connected together using transmission links in IP Routed or L2 Switched Transport Network. The Tracking Areas in the Radio Network Topology are formed more based on geographical areas rather than on the underlying Transport Network Topology. That is why there may not be correlation between Radio Tracking Areas and IP subnets/LAN Segments.

The "Idle Mode mobility" allows the mobile terminal to save battery power and reduces signaling over the radio interface when the mobile terminal has no active user data transfers (IP sessions) ongoing on the user-plane.

In the LTE/SAE system the network makes the decision about movement from LTE_ACTIVE state to the LTE_IDLE state based on user plane activity monitoring.

The mobile terminal may store the current Tracking Area Id when it is moved into LTE_IDLE state. The "serving" eNB releases the radio link connection and user related resources, transfers the UE RAN Context data to be stored in the MME node in the Core Network. The UE Idle state is informed also to the SAE GW so that it deletes the user plane data path to the eNB and prepares to buffer the downlink user data from network originated call attempts to the mobile terminal.

The LTE Base Stations (eNBs) may continuously send the LTE Cell System Information on their broadcast channel in order to let the mobile terminals to detect Cells in the operator's radio network. The System Information data contains the required Radio L1 information for mobile terminal synchronization to the Cell and L3 information indicating e.g. the Network Id, Tracking Area Id and Cell Id.

In order to control and track the mobile terminal movements in LTE_IDLE state, the mobile terminal may be responsible for scanning neighboring Cells, making Tracking Area registrations periodically (based on timer) and on movements from a Tracking Area to another. In this way the network is aware of the mobile terminal location with accuracy of a Tracking Area.

The mobile terminal must be wakening-up when a network originated call attempt occurs. This is done by paging the mobile terminal from the network via all the LTE Cells in the current Tracking Area. The mobile terminal may listen paging messages while it is scanning cells in its neighborhood periodically.

The arriving downlink user data to the SAE GW triggers paging so that an indication is first sent to the MME that sends the actual paging message to all the eNBs in the tracking area that further send it over the radio interface.

When the mobile terminal detects paging, it may initiate LTE_IDLE to LTE_ACTIVE transition i.e. performs the network re-entry procedure by connecting to a LTE Cell/Base Station that provides proper signal quality over the radio link.

The mobile terminal may perform the LTE_IDLE to ACTIVE transitions also in case a mobile terminal originated call attempt will be initiated. Now the trigger is mobile terminal internal so preceding paging is not required.

Figure 6:
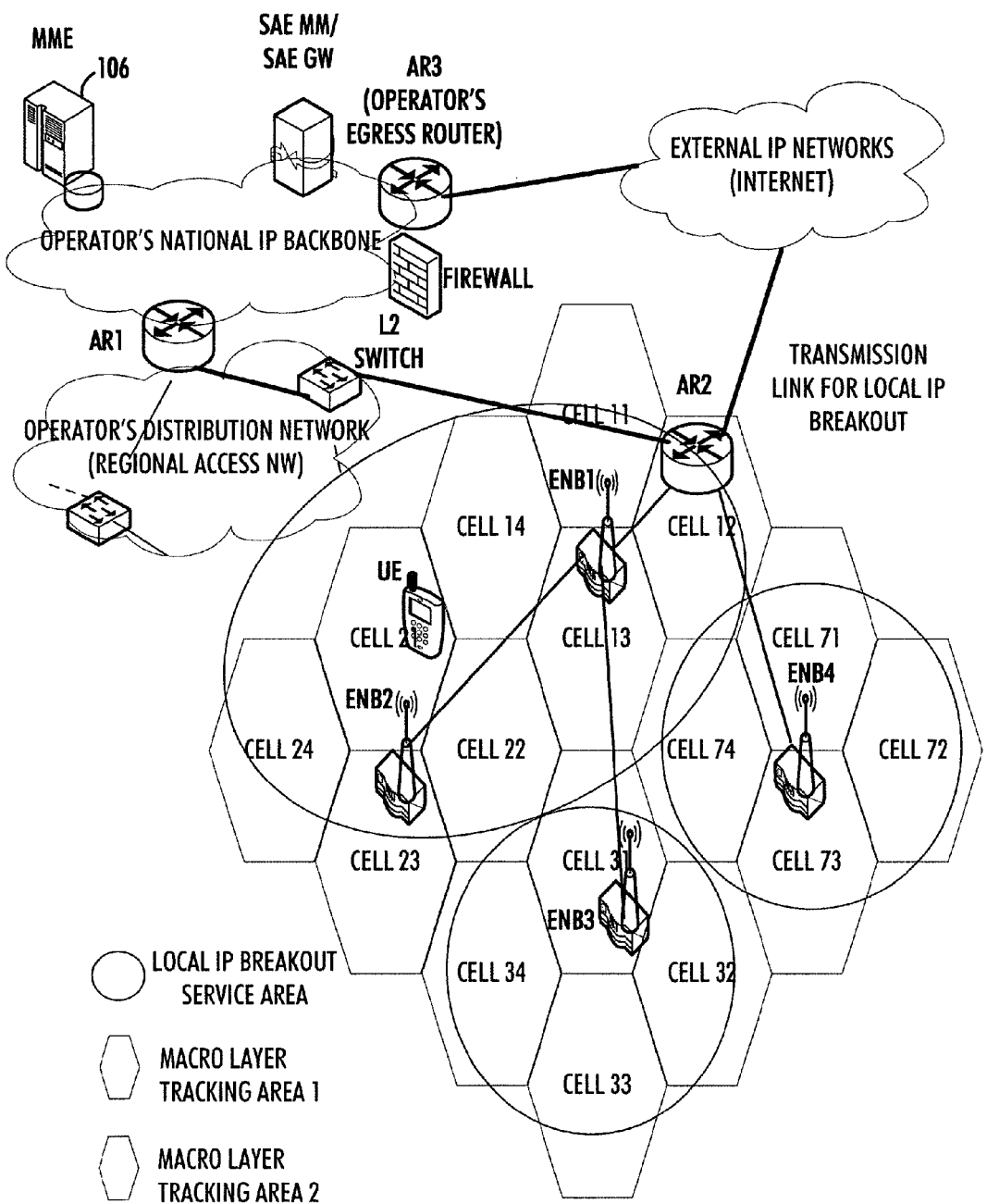
FIG. 6 is a pictorial block diagram of overlapping Tracking Areas for Macro Layer and Local IP Breakout Services.

2.1 Mobile Terminal and LTE Base Station (eNB) Operation in Idle State with Local IP Breakout Service The LTE Cells and eNBs in a Local IP Breakout Service Area are arranged into an underlying Tracking Area (TA) that may overlap with the upper Macro Layer TA (see FIG. 6).

The MME 106 of FIG. 6 may provide a repository for the RAN User Context in LTE_IDLE and idle mode tunnel management towards the SAE GW 108. The eNB that is configured to provide a Local IP Breakout Service may include also the mobile terminal's local IP breakout service related information into the UE RAN Context to be stored in the MME 106 while the mobile terminal 150 is in its Idle State.

The eNBs 160A, 160B that belong to a local IP breakout area 600 must be capable to provide Idle Mode Management functions for the Local IP Breakout Services. The latest "serving eNB" may take the role of local Paging Agent when the mobile terminal 150 is commanded into LTE_IDLE and stores the local IP breakout related UE context locally (note, could be delivered also to the MME among other UE RAN context for failure recovery purposes). The data path for the local IP breakout may be retained and the Paging Agent function in the eNB may prepare to receive and buffer the user downlink IP data that is destined to the mobile terminal's local IP address.

The network may give the required mobility information for mobile terminal movements within the local IP breakout service area. This may happen for the first time during the Network Entry procedure to the local IP breakout service and later this info is updated upon Active to Idle Mode transition procedures. The mobile terminal 150 may store this mobility information in order to determine in which neighboring Cells the local IP breakout service can continue. The local IP breakout mobility information may consist of the related Service Id, Service Type, Tracking Aread ID, Cell IDs and Network ID. In addition to this the UE may store the latest "Serving eNB" Identifier so that User Context for local IP Breakout Service can be retrieved to any other eNB in the service area upon Idle to Active transition procedure.

Based on this stored mobility information, the mobile terminal 150 is able to select and enter to a proper LTE Cell in cell re-select situations e.g. after radio link failure, or in Idle to Active State transitions etc.

The LTE Base Stations (eNBs) may send the LTE Cell System Information on their broadcast channel in order to let the mobile terminals to detect Cells in the operator's radio network. When an eNB is configured to support Local IP Breakout Service, it may advertise the related Service Id, Service Type, Cell Id, Tracking Area Id and Network Id among the ordinary cellular operator's mobility information at Macro Layer.

The mobile terminal in LTE_IDLE state may be responsible for scanning neighboring Cells, listening paging, making Tracking Area registrations periodically (based on timer) and on movements from a Tracking Area to another. In this way the mobile terminal is able keep track on local IP breakout service availability and on demand (either due to paging or mobile terminal originated session) to re-enter to a proper neighboring LTE Cell based on its stored local IP breakout mobility info. On the other hand the network (MME) is aware of the mobile terminal location with accuracy of a Tracking Area.

The eNB that serves in a role of a local Paging Agent to the mobile terminal may wait arriving DL packets destined to the mobile terminal's local IP address and is prepared to buffer those packets until user plane connectivity to the mobile terminal is re-established. The reception of a downlink packet may trigger the eNB to perform mobile terminal paging via all the LTE Cells/eNBs that belong to the local IP breakout service area.

Mobile terminal Paging is utilized e.g. by sending the paging command over the X2 interface to the corresponding IP multicast group to which the neighboring eNBs are registered. Each eNB then sends the paging command over the radio interface that the mobile terminal may listen periodically.

The mobile terminal may initiate movement from Idle to Active State (Network Re-Entry procedure) upon reception of a Paging Command (due to network originated session), or due to UE originated Session. In case the mobile terminal is set to monitor LBO service availability, it may move from Idle to Active State in order to perform Network Entry procedure to a Local IP Breakout Service.

2.2 UE Movement from Active to Idle State with Local IP Breakout Service

In normal situation when the mobile terminal has some IP session active, i.e. there is data transfer on user plane, the mobile terminal may be in LTE_ACTIVE state. In case the mobile terminal has activated the local IP breakout service the SAE Bearer services may be maintained in parallel for the network-originated sessions. Thus the data path for SAE Bearer service (S1-U tunnel) and the user plane connectivity for the Local IP Breakout service (either non-tunneled or IP tunneled) are established between the eNB and SAE GW and Local IP Gateway with the corresponding Radio Bearers over the radio interface.

The LTE Base Stations may make the decision about mobile terminal movement from LTE_ACTIVE state to the LTE_IDLE state when inactivity timer on the user plane expires i.e. there has not been user data transfer within pre-determined period. The user plane inactivity monitoring may work for all IP sessions including both the SAE Bearer and the Local IP Breakout Services.

Figure 7A:
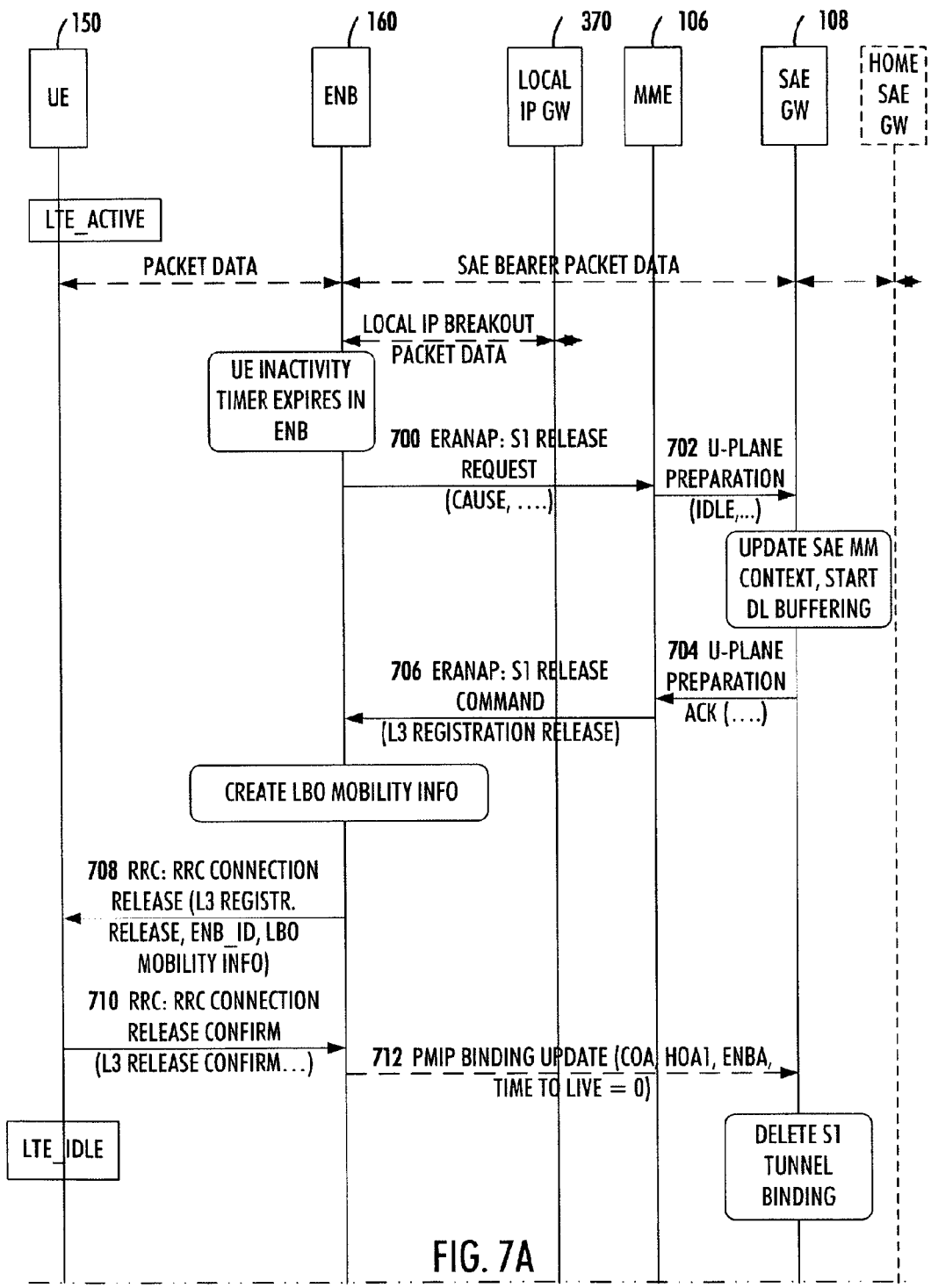
FIGS. 7A and 7B are a signal sequence diagram illustrating an example of the mobile terminal movement from Active to Idle State transition procedure with local IP breakout service.
Figure 7B:
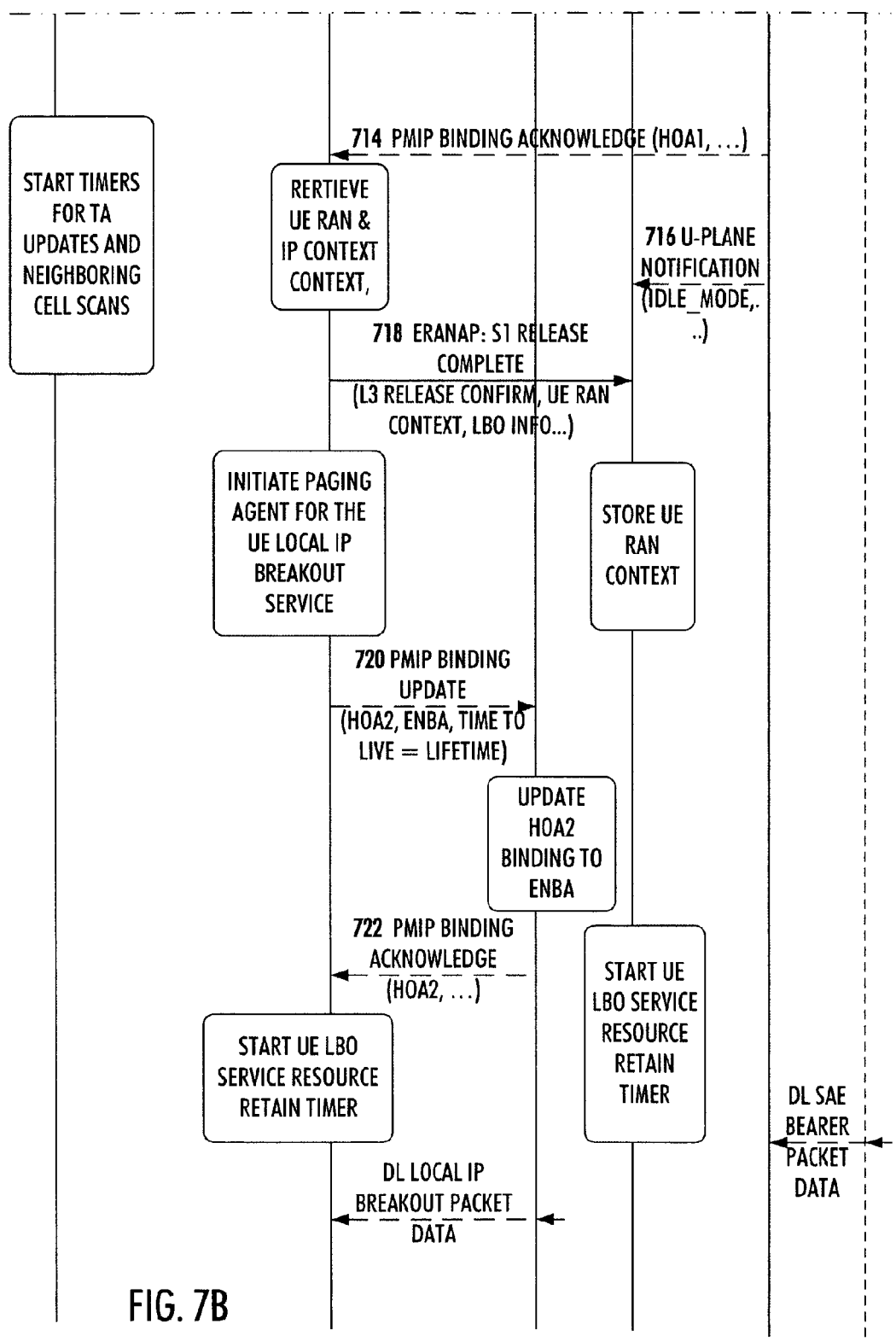

The signaling flow in FIG. 7 illustrates the mobile terminal movement from Active to Idle State transition procedure with local IP breakout service.

Initially the mobile terminal 150 is in LTE_ACTIVE State and the eNB 160 is monitoring user plane activity both for the SAE Bearer and Local IP Breakout services in order to make decision about mobile terminal 150 movement to the Idle State. When a pre-determined inactivity time is exceeded, the eNB 160 initiates the mobile terminal Active to Idle State transition procedure as follows:

In 700, the eNB 160 sends the S1 Release Request message to the MME indicating that the mobile terminal 150 will be moved to LTE_IDLE state. In 702, the MME 106 sends the U-Plane Preparation message to the SAE GW 108 in order to indicate Idle Mode and to start user downlink data buffering function.

In 704, the SAE GW 108 sends the U-Plane Preparation Ack message to the MME 106. In 706, the MME 106 sends the S1 Release Command message to the eNB 160 that contains the L3 Registration Release Command to the mobile terminal 150.

In 708, the eNB 160 checks that a Local IP Breakout Service is activated and creates the up-to-date Mobility Information for the Local Breakout Service including the related Service Id, Service Type, Tracking Aread ID, Cell IDs and Network ID. The eNB 160 may send this LBO mobility information and its own eNB Id included into the RRC Connection Release message to the mobile terminal 150.

In 710, the mobile terminal 150 responds with a RRC Connection Release Confirm message to the eNB 160 containing the L3 Registration Release Confirm destined to the MME 106. From now on the mobile terminal 150 disconnects radio link and moves to LTE_IDLE state for battery saving and wakes up periodically to perform Cell Scans, Tracking Area registrations, detecting Tracking Area crossings and listening Paging.

In 712, in case a Proxy Mobile IP (PMIP) controlled S1-U tunnel is applied, the eNB 160 sends the PMIP Binding Update message to the SAE GW 108 with lifetime value zero in order to delete binding of the user IP address for the SAE Bearer Service (HoA1) to the S1-U tunnel. From now on the arriving user downlink packet that is destined to HoA1 may trigger UE paging via the MME 106.

In 714, the SAE GW 108 sends the PMIP Binding Acknowledge message to the eNB 160 indicating that the S1-U tunnel is removed. In 716, the SAE GW 108 sends the U-Plane Notification message with Idle state indication to the MME 106 in order to ensure that S1-U tunnel is removed to the eNB 160.

In 718, the eNB 160 sends the S1 Release Complete message to the MME 106 containing the L3 Release Confirm from the mobile terminal 150 and the UE RAN Context to be stored into MME 106. The latter may contain also the local IP breakout related UE context and the MME initiate a LBO Service resource retain timer for failure recovery purposes.

In 720, the eNB 160 initiates the Paging Agent function for the Local IP Breakout Service and continues storing the local IP breakout related UE context locally and prepares to receive and buffer the user downlink IP data that is destined to the mobile terminal's local IP address (HoA2). In case the Local IP GW 170 is located behind a router hop(s) the eNB 160 may send the PMIP Binding Update message to the Local IP GW 170 with its full lifetime value in order to keep the local IP tunnel alive while the mobile terminal 150 is in Idle State.

In 722, the Local IP GW 170 responds with PMIP Binding Acknowledge message to the eNB 160 indicating that the local IP tunnel is refreshed. Now the eNB 160 may start a LBO Service resource retain timer for failure recovery purposes i.e. the Paging Agent function and other user context data can be cleared upon timer expiration.

2.3 UE Idle Mode Procedures with Local IP Breakout Service

When the mobile terminal is in LTE_IDLE mode, the network has no radio link connectivity to the mobile terminal, so the mobile terminal must itself keep track of the available LTE Cells in its neighborhood in order to re-enter to the network when user plane connectivity will be required again. While being in the Idle State the mobile terminal may wake up periodically for performing Cell Scans, detecting Tracking Area crossings and listening Paging. Also the UE may run a timer for periodical Tracking Area Registrations to the MME in order to keep the network aware of mobile terminal existence in the network service area.

Figure 8:
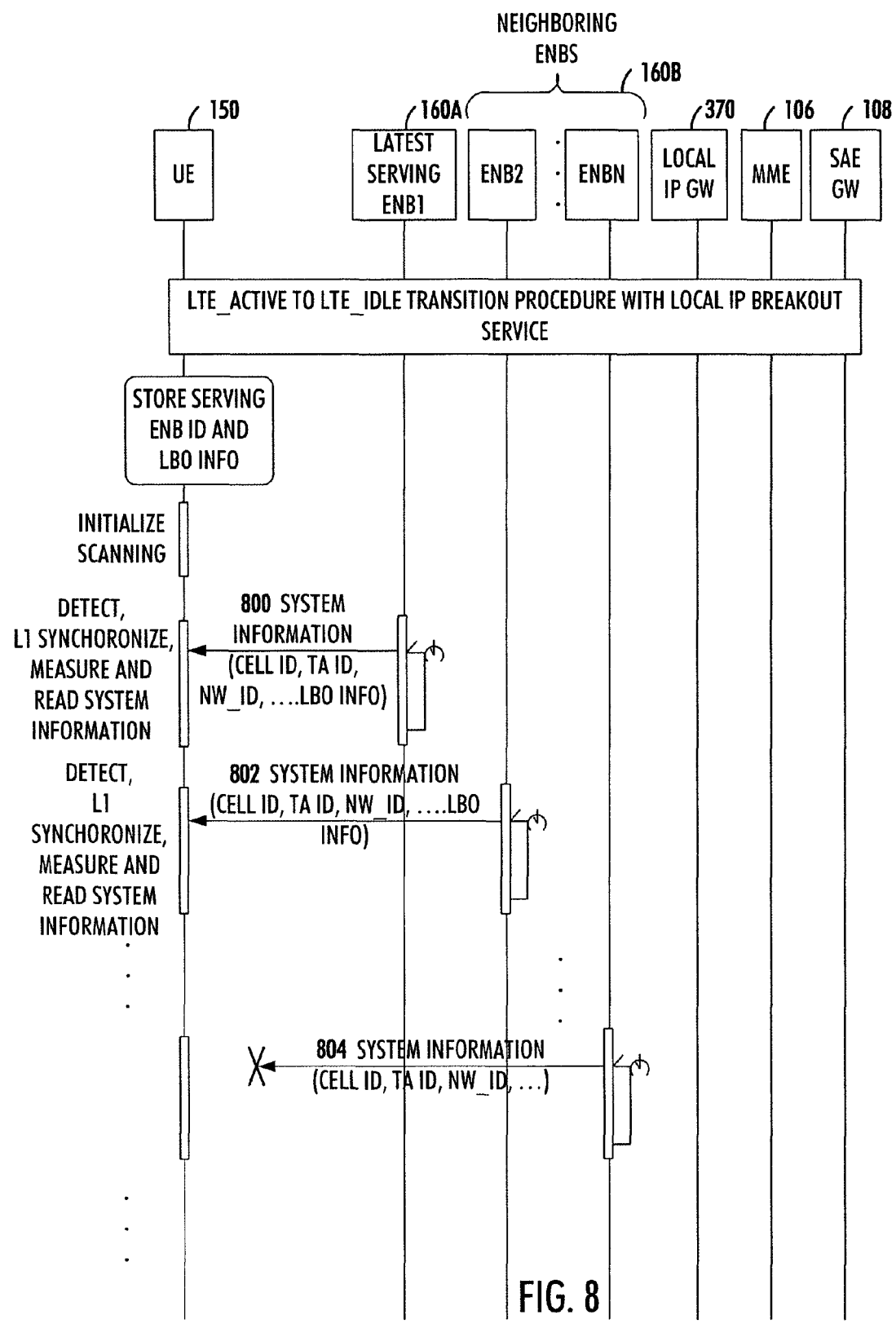
FIG. 8 is a signal sequence diagram illustrating an example of mobile terminal scanning neighborhood cells in Idle mode.

FIG. 8 illustrates how the LTE Base Stations (eNBs) send the repeated LTE Cell System Information on their broadcast channel in order to let the mobile terminals to detect Cells in the operator's radio network (800 to 804). When the eNB is configured to support Local IP Breakout Service, it may advertise the Local Breakout Information in addition to the ordinary cellular operator's system information at Macro Layer.

Figure 9A:
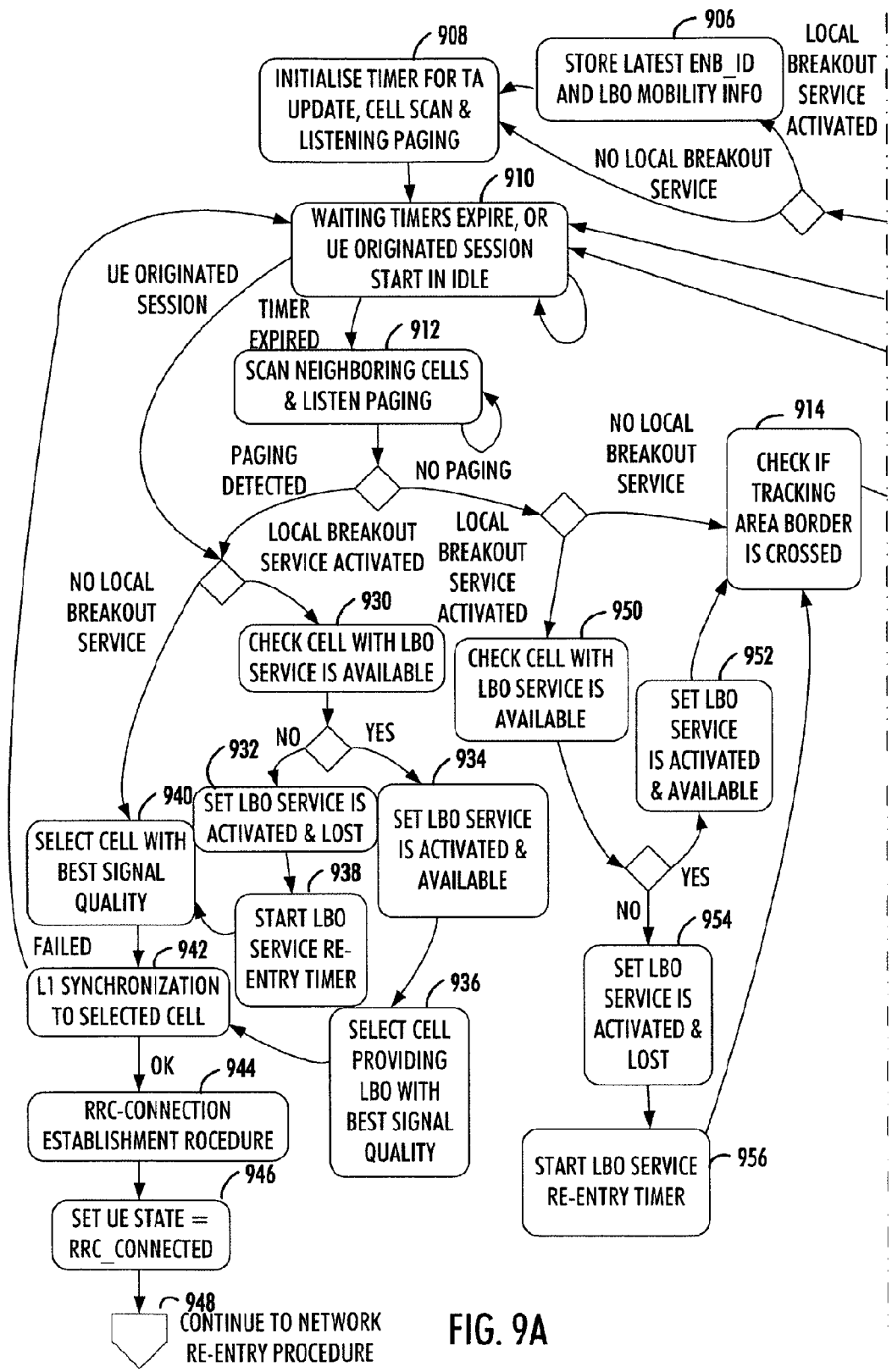
FIGS. 9A and 9B are flowcharts of examples of mobile terminal Idle mode operations with local IP breakout service.
Figure 9B:
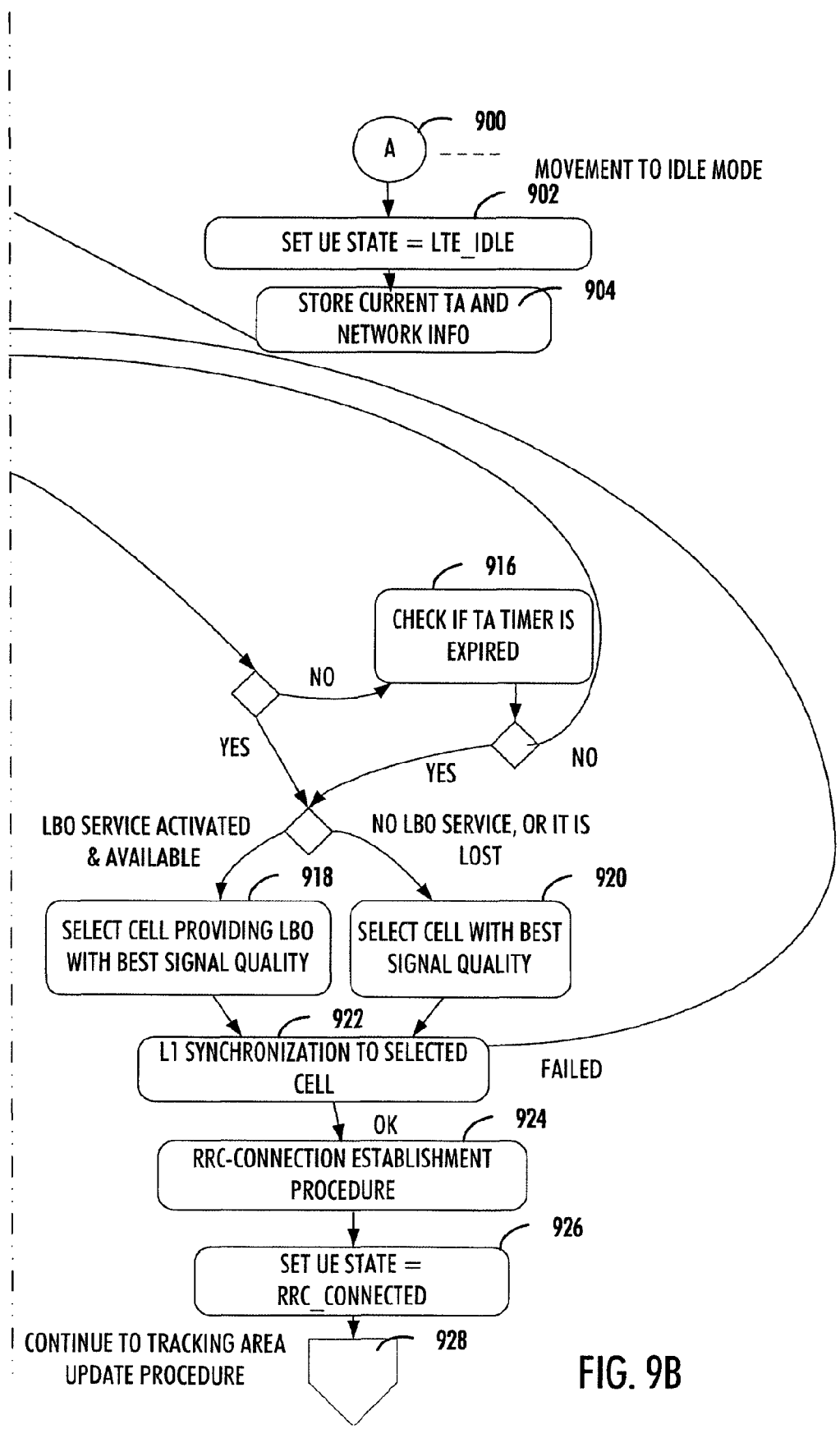

The mobile terminal that has activated a local IP Breakout Service may scan the neighboring Cells according to standard except it checks from the received system information whether it has stayed within the local breakout service coverage and selects a Cell for re-entry preferring local breakout service availability as illustrated in FIG. 9.

In 900, UE moves to Idle mode. In 902, UE state is set to LTE_IDLE. In 904, current TA and Network information is stored. If Local breakout service is activated, 906 is entered where latest eNB_Id and LBO Mobility information is stored. If no Local breakout service is needed at this point, 908 is entered, where timer is initialized for TA Update, Cell Scan and Listening Paging.

In 910, waiting timers are expired or UE originated session starts in the Idle mode. If the timer is expired, 912 is entered where neighboring Cells are scanned and paging is listened. If no paging is detected and no Local breakout service is needed, 914 is entered where it is checked whether Tracking Area border is crossed. If no, in 916 it is checked if TA timer has expired. If yes and LBO service is activated and available, then in 918 a Cell providing LBO with best signal quality is selected. If no LBO service is available or it is lost, in 920 a Cell with best signal quality is selected. In 922, L1 synchronization to selected cell is performed. In 924, RRC-connection establishment procedure is performed. In 926, UE state is set to RRC_CONNECTED. In 928, it is continued to tracking area update procedure.

If in 912, paging is not detected and Local breakout service is activated, then 950 is entered where it checked whether a cell with LBO service is available. If not, 954 is entered where LBO service is set activated and lost. In 956, LBO service re-entry time is started, and 914 is entered after that. If yes, 952 is entered where LBO service is set activated and available. If in 912, paging is detected and local breakout service is activated, 930 is entered where it is checked whether a cell with LBO service is available. If yes, 934 is entered where LBO service is set activated and available. If not, 932 is entered where LBO service is set activated and lost. In 936, a cell providing LBO with best signal quality is selected. In 938, LBO service re-entry timer is started. In 940, a cell with best signal quality is selected. In 942, L1 synchronization to selected cell is performed. In 944, RRC connection establishment procedure is performed. In 946, UE state is set to RRC_CONNECTED. In 948, it is continued to Network re-entry procedure.

2.3.1 Tracking Area Updates with Local IP Breakout, Normal Case

The periodical Tracking Area Updates keep the network (MME) aware of mobile terminal reachability and its location with accuracy of a TA even in situations when the mobile terminal stays all the time within the TA coverage area. The mobile terminal selects a proper LTE Cell through it performs the TA Update based on the preceding Cell Scan measurement results. In case a local IP breakout service has been activated the mobile terminal may prefer selecting Cells through LBO service can be continued. If the mobile terminal is able to obtain sufficient radio link signal quality to some LTE Cell in the local IP breakout area i.e. the mobile terminal has remained at the service coverage area, and the TA Update Timer has expired, it may perform Tracking Area (TA) Update to the network (MME) indicating its reachability within the local IP breakout service coverage area (LBO Info may be included into registration message).

Figure 10:
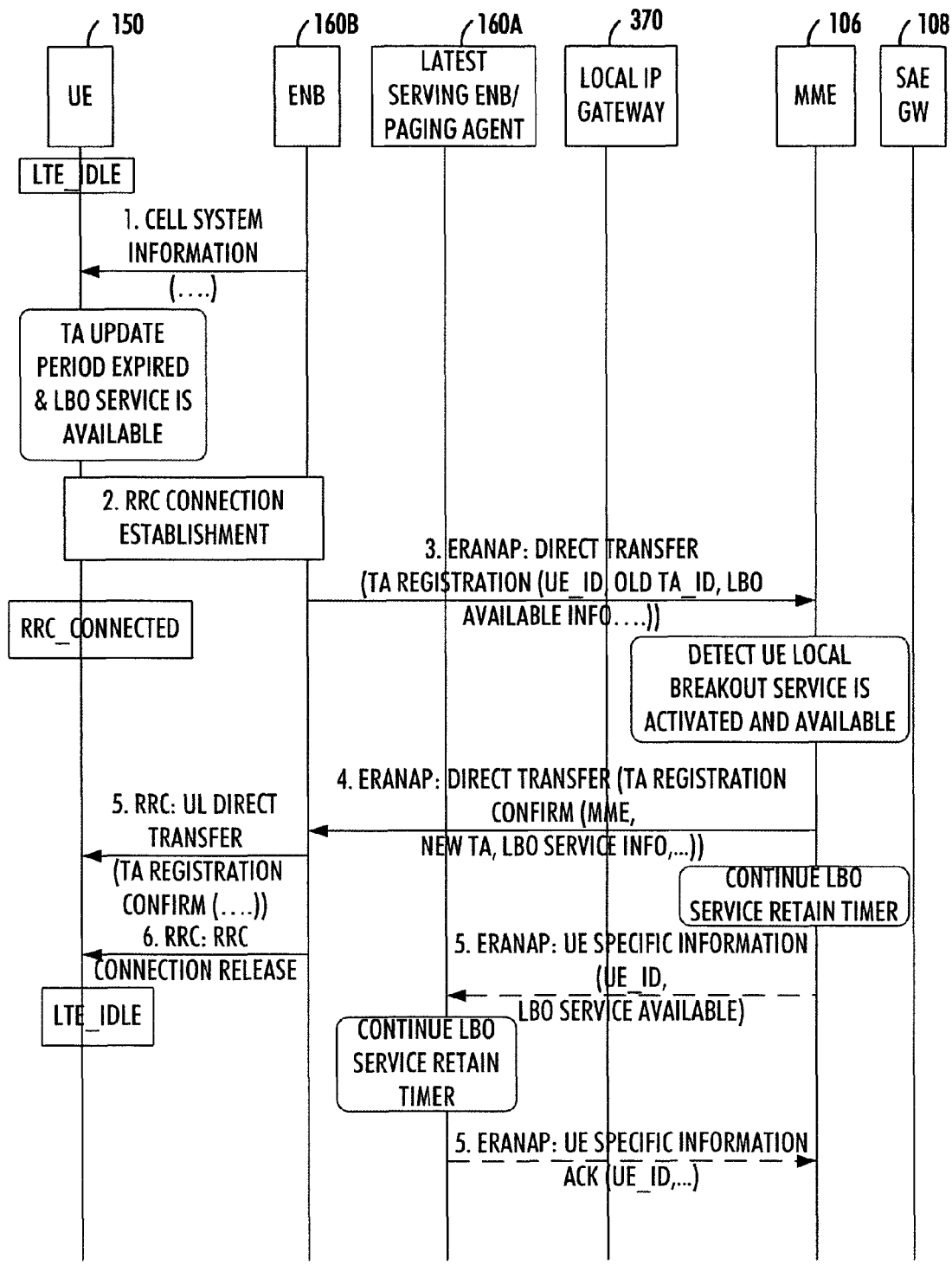
FIG. 10 is a signal sequence diagram illustrating an example of periodical Tracking Area update with local IP breakout service (normal case)

Also the MME may re-start its LBO Service resource retain timer (continues time for storing the related user context) and also may send indication to the latest serving eNB/Paging Agent in order to continue LBO service retain time also there. This is illustrated in FIG. 10.

2.3.2 Indicating Local IP Breakout Service Availability During Tracking Area Updates The mobile terminal may receive indication about the local IP breakout service availability while it performs the Tracking Area Update in LTE_IDLE mode (location tracking). This may occur due to crossing a TA border, or upon TA update timer expiration.

In the TA Update procedure the mobile terminal may select and connect to a proper LTE Cell and sends the TA Registration to the MME containing UE identifiers and the TA information.

Figure 11:
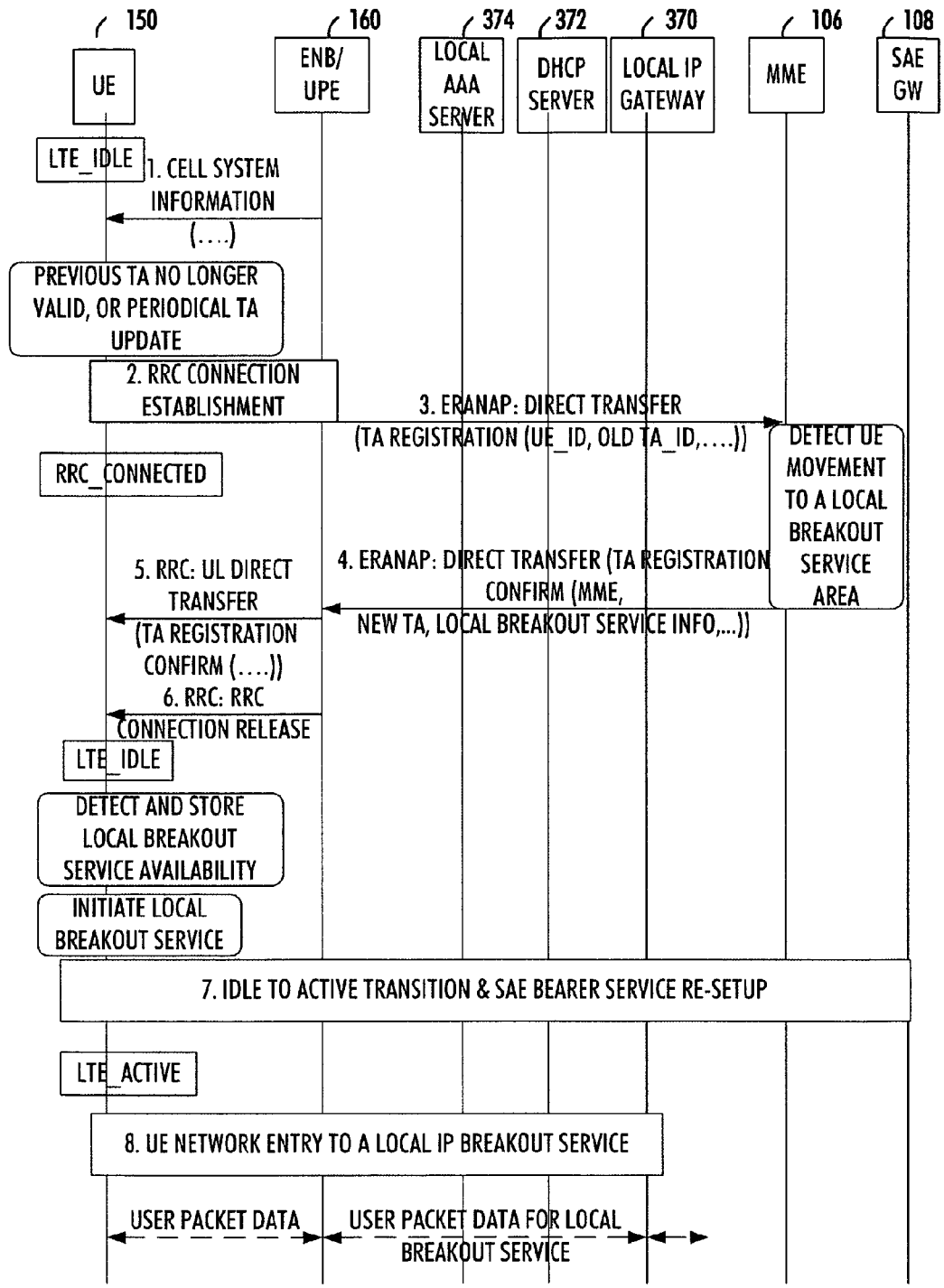
FIG. 11 is a signal sequence diagram illustrating an example of indicating local IP breakout service availability during Tracking Area updates.

Now the MME may detect that the mobile terminal has moved to LBO service coverage area, checks if user subscription enables mobile terminal to use LBO service and may include the Local Breakout Service Info into the TA Registration Confirm message (See FIG. 11) that will be sent to the mobile terminal.

The mobile terminal may give indication about Local Breakout service availability to the user for manual service entry, or initiates Idle to Active state transition in order to perform automatic Network Entry procedure to a Local IP Breakout Service.

2.3.3 Tracking Area Update with Local IP Breakout, Movement Out of LBO Service Area In case a local IP breakout service has been activated and based on periodic Cell Scan the mobile terminal detects that it is no more able to obtain sufficient radio link signal quality to any LTE Cell in the local IP breakout area i.e. the mobile terminal has moved out of service coverage area, it may initiate a Re-Entry timer for retaining local IP breakout service related resources and performs instant Tracking Area (TA) Update to the network (MME) indicating movement out of local IP breakout service coverage area.

Upon reception of the LBO service lost information also the MME may initiate a corresponding timer for retaining local IP breakout service related user context. In case the mobile terminal cannot obtain connectivity to any Cell in the Local IP Breakout Service area before the Re-Entry Timer expires, it may release all the LBO service related resources i.e. terminates the local IP breakout service.

From now on the mobile terminal must perform a full Network Entry procedure to a Local IP Breakout Service in case it happens to move back to the service coverage area and will re-start LBO services again.

About at the same time as in the mobile terminal the LBO retain timer may expire also in the MME (see the FIG. 11) that may send indication to the latest serving eNB/Paging Agent in order to release LBO service related resources there. Also the MME may clear all the mobile terminal's local IP breakout related context and retains only the SAE Bearer Services related user context.

Figure 12:
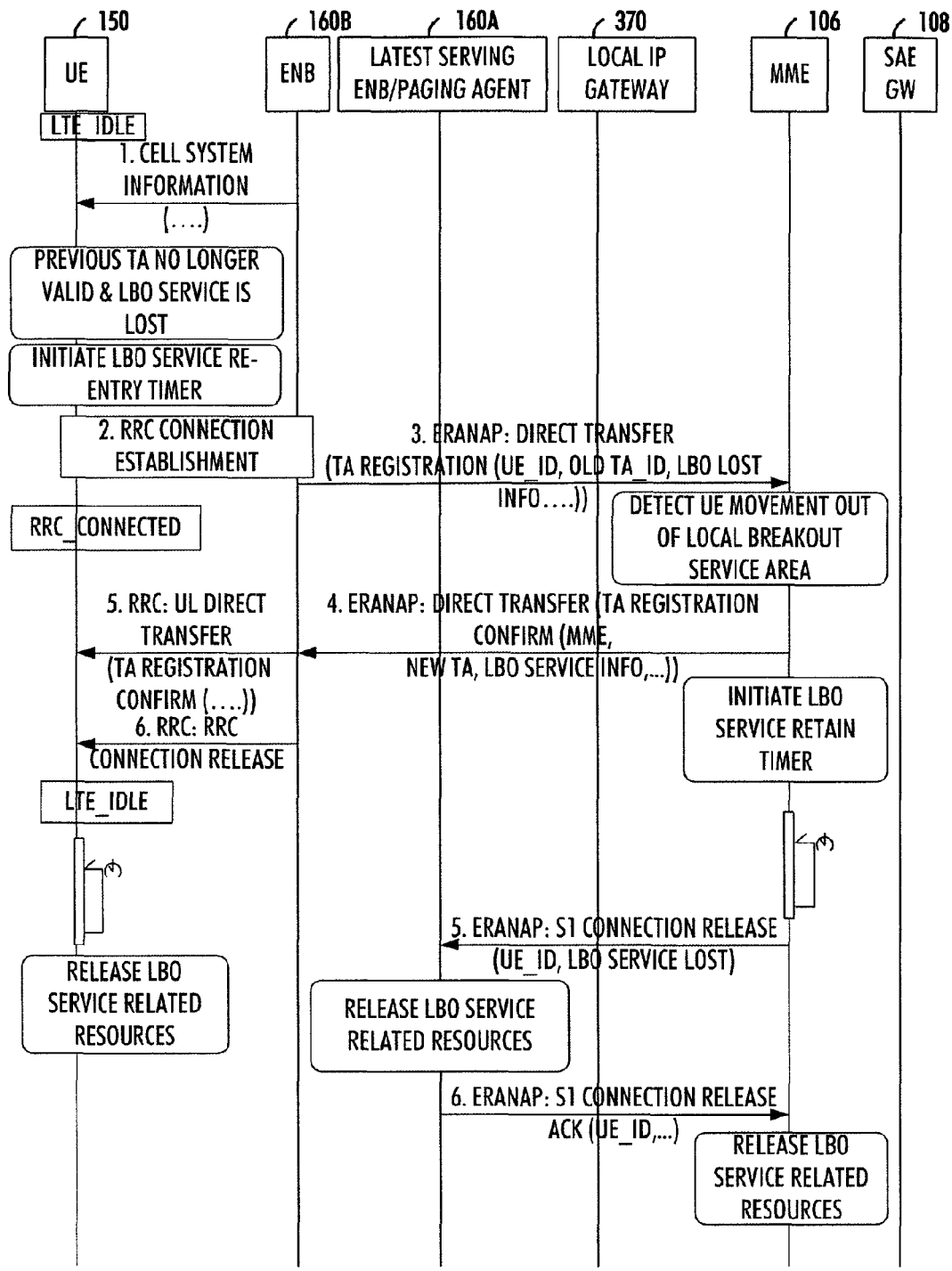
FIG. 12 is a signal sequence diagram illustrating an example of Tracking Area update with local IP breakout service (movement out of LBO service area)

FIG. 12 shows Tracking Area Update procedure with Local IP Breakout with movement out of LBO Serving area.

2.3.4 Paging with Local IP Breakout

When the mobile terminal has activated a local IP breakout service, the latest serving eNB may provide the paging agent function to the mobile terminal and waits for arriving DL packets destined to the mobile terminal's local IP address (some other peer is trying to connect to the mobile terminal) and is prepared to buffer those packets until user plane connectivity to the mobile terminal is re-established. The reception of a downlink packet may trigger the eNB to perform mobile terminal paging via all the LTE Cells/eNBs that belong to the local IP breakout service area.

Figure 13:
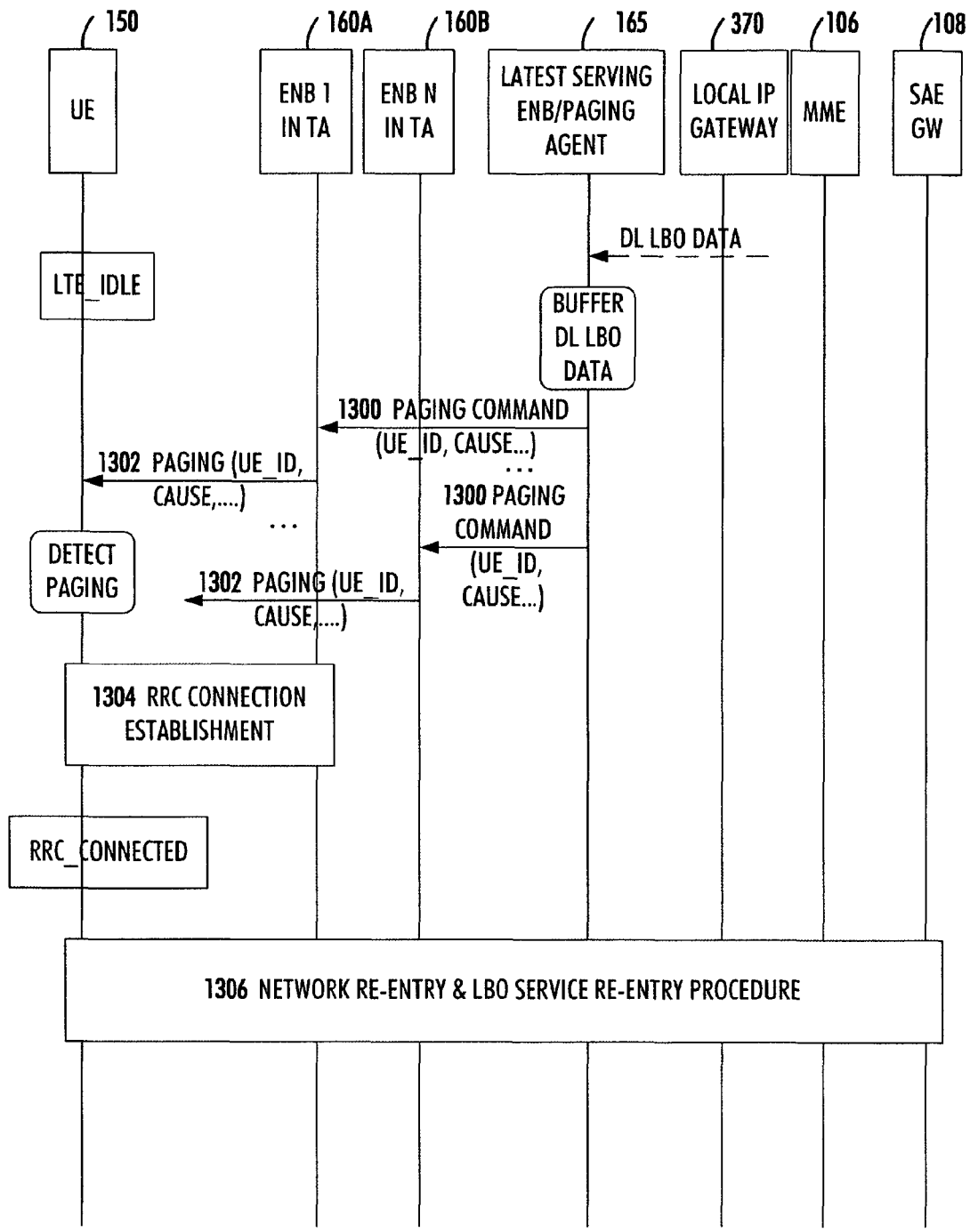
FIG. 13 is a signal sequence diagram illustrating an example of paging with local IP breakout service.

FIG. 13 illustrates paging with Local IP Breakout. In 1300, when a DL data packet to the mobile terminal 150 is received in the eNB/Paging Agent 165, it may be stored into DL LBO buffer and the eNB 165 creates and sends the Paging Command message to all eNBs 160A, 160B in the Local Breakout Tracking Area including the UE Id and a paging cause (e.g. LBO) etc. In 1302, each eNB 160A, 160B may send the Paging message with mobile terminal Id on the broadcast (or paging) channel over radio so that mobile terminals in Idle mode may detect paging while doing periodical Cell Scannings. In 1304, the mobile terminal 150 that detects paging to itself and has activated LBO service initiate the Network Re-Entry procedure that start by selecting a proper LTE Cell in which LBO service can be continued and initiates the RRC Connection Establishment procedure. In 1306, when the RRC connection is established, the mobile terminal 150 may perform Network Re-Entry procedure both to obtain the SAE Bearer Services and LBO Service in parallel.

2.4 Continuation of Local IP Breakout Service after Idle to Active State Transition (Network RE-Entry)

The mobile terminal may continue to use local IP breakout service after Idle to Active State Transition (Network Re-Entry procedure) in case it is able to retain radio link connectivity via a LTE Cell in the LBO service coverage area.

The mobile terminal may have stored the local IP breakout service related Cell IDs, Tracking Area ID and Network ID before movement to LTE_IDLE state so that it is able to select and enter to a proper LTE Cell in cell re-selection (see FIG. 9).

Figure 14A:
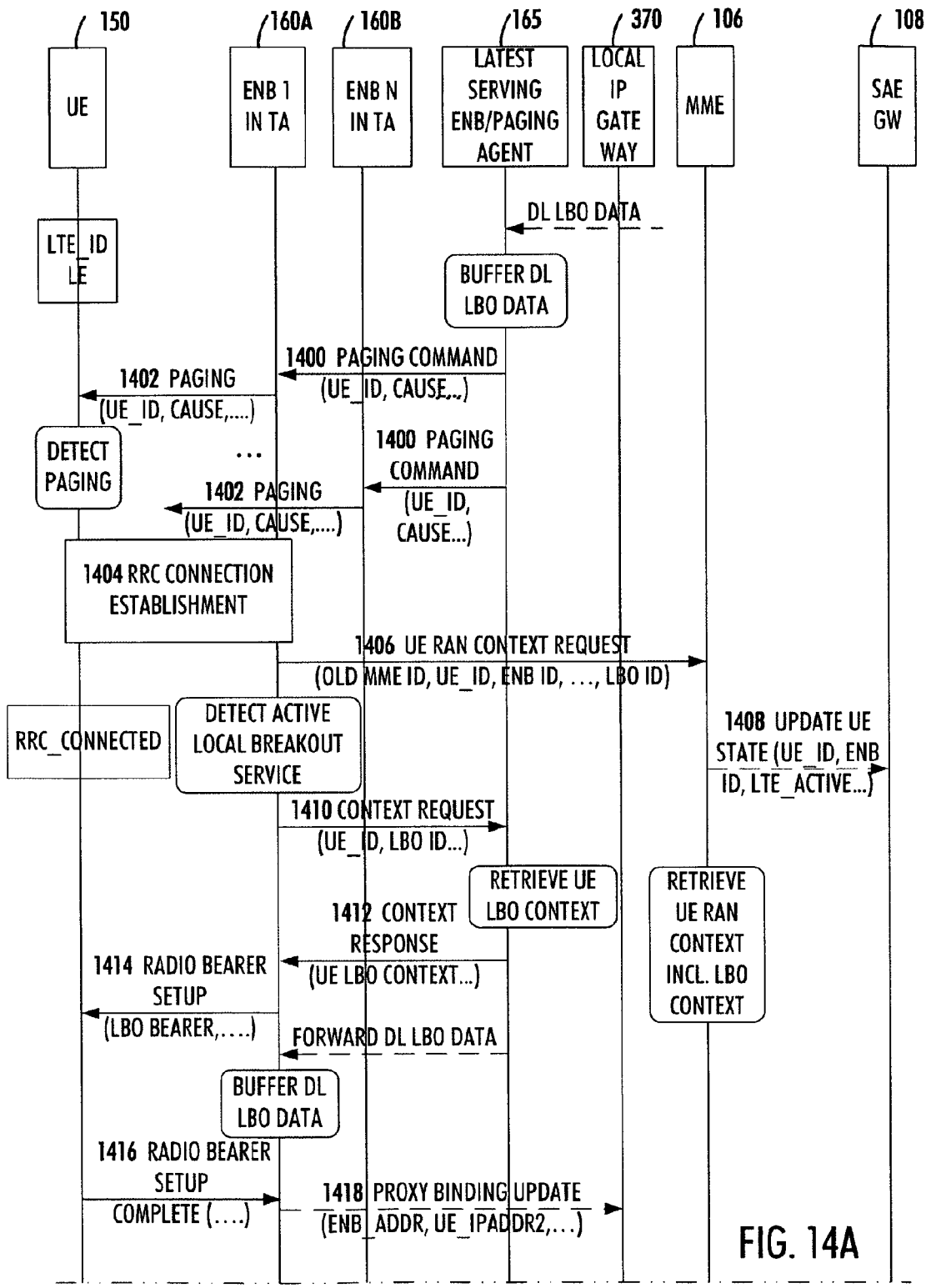
FIG. 14 is a signal sequence diagram illustrating an example of mobile terminal Idle to Active transition (Network re-entry) due to paging.
Figure 14B:
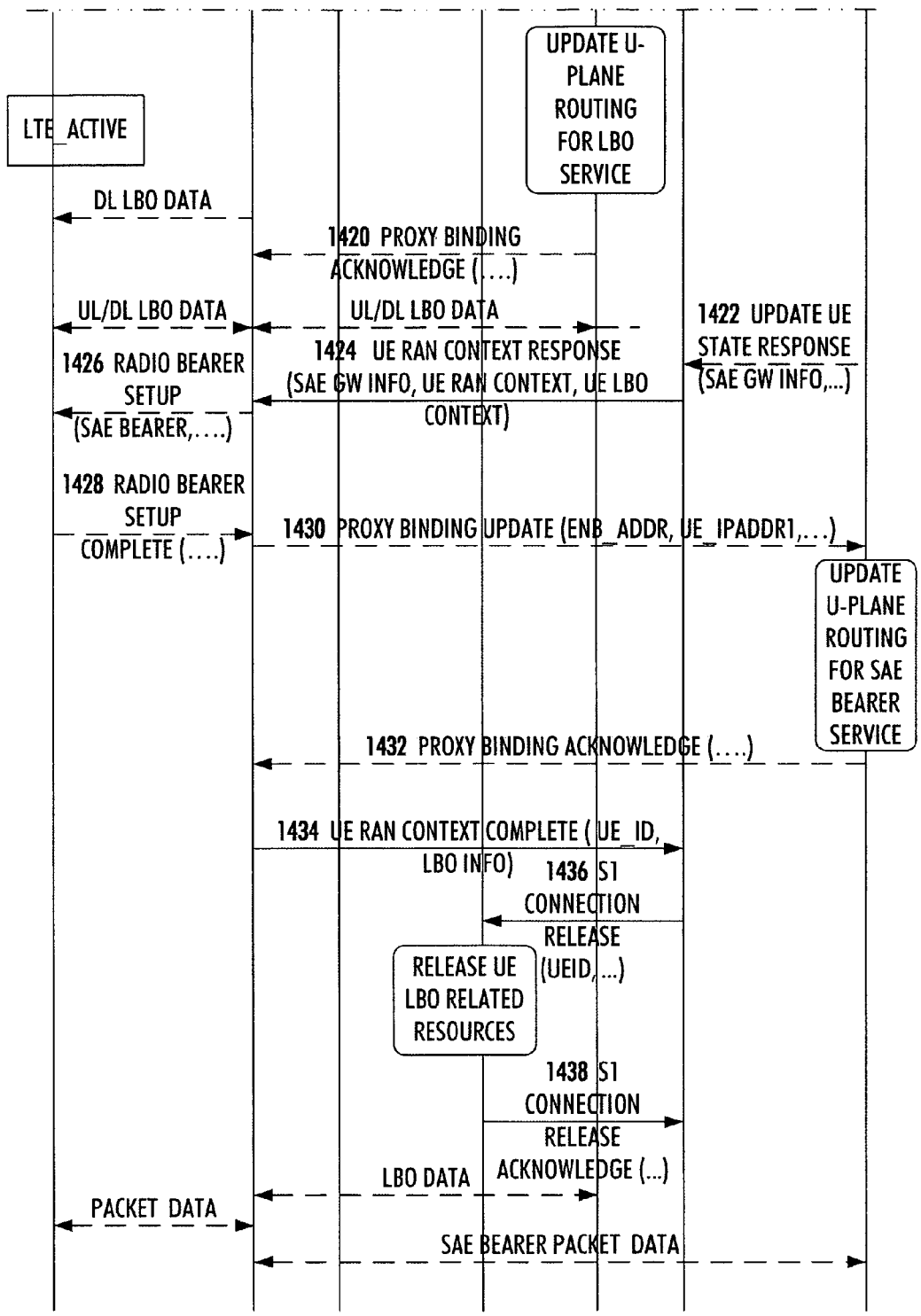

The FIG. 14 illustrates the mobile terminal movement from Idle to Active State transition procedure with local IP breakout service that is triggered by paging from the latest serving eNB/Paging Agent (reason for Network Re-Entry could be also UE Originated session).

Initially the "latest serving eNB/Paging Agent" is waiting for arriving DL packets destined to the mobile terminal's local IP address (some other peer is trying to connect to the mobile terminal) and is prepared to buffer those packets until user plane connectivity to the mobile terminal is re-established.

In 1400, when a DL data packet to the mobile terminal 150 is received in the latest serving eNB/Paging Agent 165, it may initiate the paging procedure via all the eNBs 160A, 160B in the Tracking Area.

In 1402, the mobile terminal 150 detects paging to itself, selects a Cell with proper radio signal quality in which the LBO service can be obtained.

In 1404, the mobile terminal 150 performs the RRC Connection Establishment procedure to the selected Cell/eNB 160A indicating its UE Id and the latest serving eNB Id for the LBO service in order to let the new eNB 160A to retrieve LBO related user context from the latest serving eNB/Paging Agent 165.

In 1406, the new eNB 160A sends the UE RAN Context Request message to the MME 106 that upon reception of the message retrieves the UE RAN context and LBO context to be sent to the requesting new eNB.

In 1408, the MME 106 sends the Update UE State message with UE Id, new eNB Id and LTE_ACTIVE state info to the SAE GW 108 in order to prepare SAE Bearer services on the S1-U interface.

In 1410, the eNB 160A detects that mobile terminal 150 has a LBO service activated and sends the Context Request message with mobile terminal Id and LBO Id to the given latest serving eNB/Paging Agent 165.

In 1412, the latest serving eNB/Paging Agent 165 sends the Context Response message containing the mobile terminal LBO service related context and initiates DL data forwarding to the new eNB 160A.

In 1414, the new eNB 160A may send the Radio Bearer Setup message to the mobile terminal 150 in order to establish a Radio Bearer for the LBO service and prepares to receive and buffer the forwarded DL data from the latest serving eNB 165.

In 1416, the mobile terminal 150 responds with the Radio Bearer Setup Complete message to the eNB 160A. From now on the mobile terminal has obtained user plane connectivity for the LBO service, has moved to LTE_ACTIVE state and the new eNB is able to deliver the forwarded DL packets to mobile terminal.

In 1418, in case the Local IP GW 370 is located behind multiple router hops, the new eNB may send the Proxy Binding Update message to the Local IP GW containing new eNB Address and UE IP Address to LBO services. The IP GW 370 may update U-Plane routing to new eNB. Note, in case the Local IP GW will be the next hop router to the eNB then the eNB may send a Proxy ARP (IPv4) or a Proxy Neighbor Advertisement (IPv6) in order to update binding cache in the Local IP GW (Access Router) and forwarding tables in the possible intermediate L2 Switches.

In 1420, the Local IP GW 370 responds with the Proxy Binding Acknowledge message. From now on the user DL data for the LBO service may be routed directly to the new eNB.

In 1422, the SAE GW 108 sends the Update UE State Response message indicating that the S1 U-plane preparation for is performed.

In 1424, the MME 106 sends the UE RAN Context Response message to the new eNB containing the UE RAN context data and the SAE GW related information.

In 1426, the eNB 160A sends the Radio Bearer Setup message to the mobile terminal 150 in order to establish a Radio Bearer for the SAE Bearer service.

In 1428, the mobile terminal 150 responds with the Radio Bearer Setup Complete message to the eNB. From now on the user plane connectivity is available over the radio also for the SAE Bearer services.

In 1430, the eNB 160A may send the Proxy Binding Update message (or GTP-U path update) to the SAE GW 108 in order to switch the u-plane route for the SAE Bearer services to the new eNB.

In 1432, the SAE GW 108 may send the Proxy Binding Acknowledge message (or GTP-U path update ack) to the eNB 160A indicating successful data path switching.

In 1434, the eNB 160A sends the UE RAN Context Complete message to the MME 106 indicating that all services for the mobile terminal are established in the eNB. This message may deliver the latest LBO context data to the MME.

In 1436, the MME 106 sends the S1 Connection Release message to the latest serving eNB/Paging Agent 165 in order to let it to release the mobile terminal LBO related resources.

In 1438, the latest serving eNB/Paging Agent 165 sends the S1 Connection Release Acknowledge message to the MME 106 indicating that it has released UE related resources.

Figure 15A:
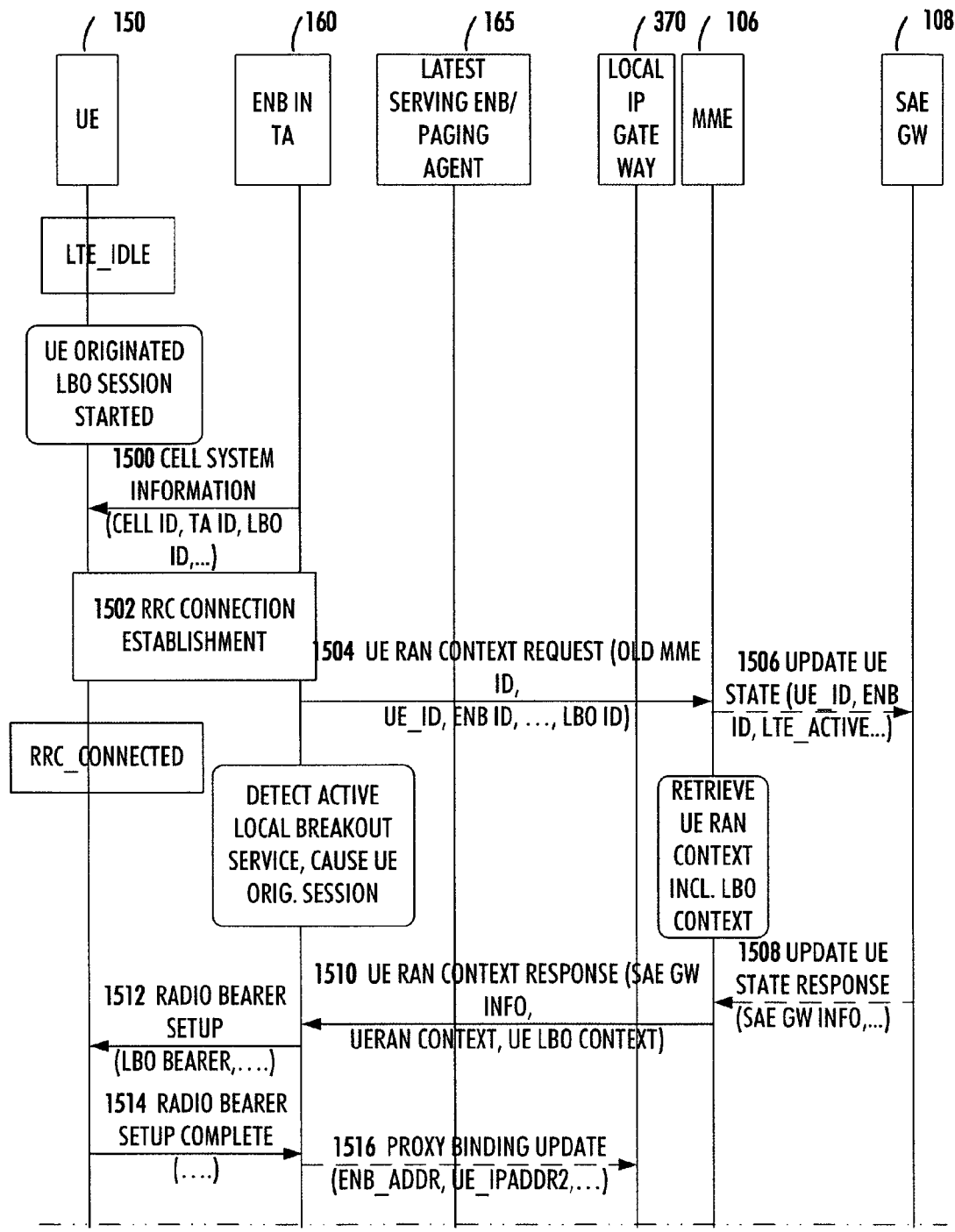
FIG. 15 is a signal sequence diagram illustrating an example of mobile terminal Idle to Active transition due to mobile terminal originated session.
Figure 15B:
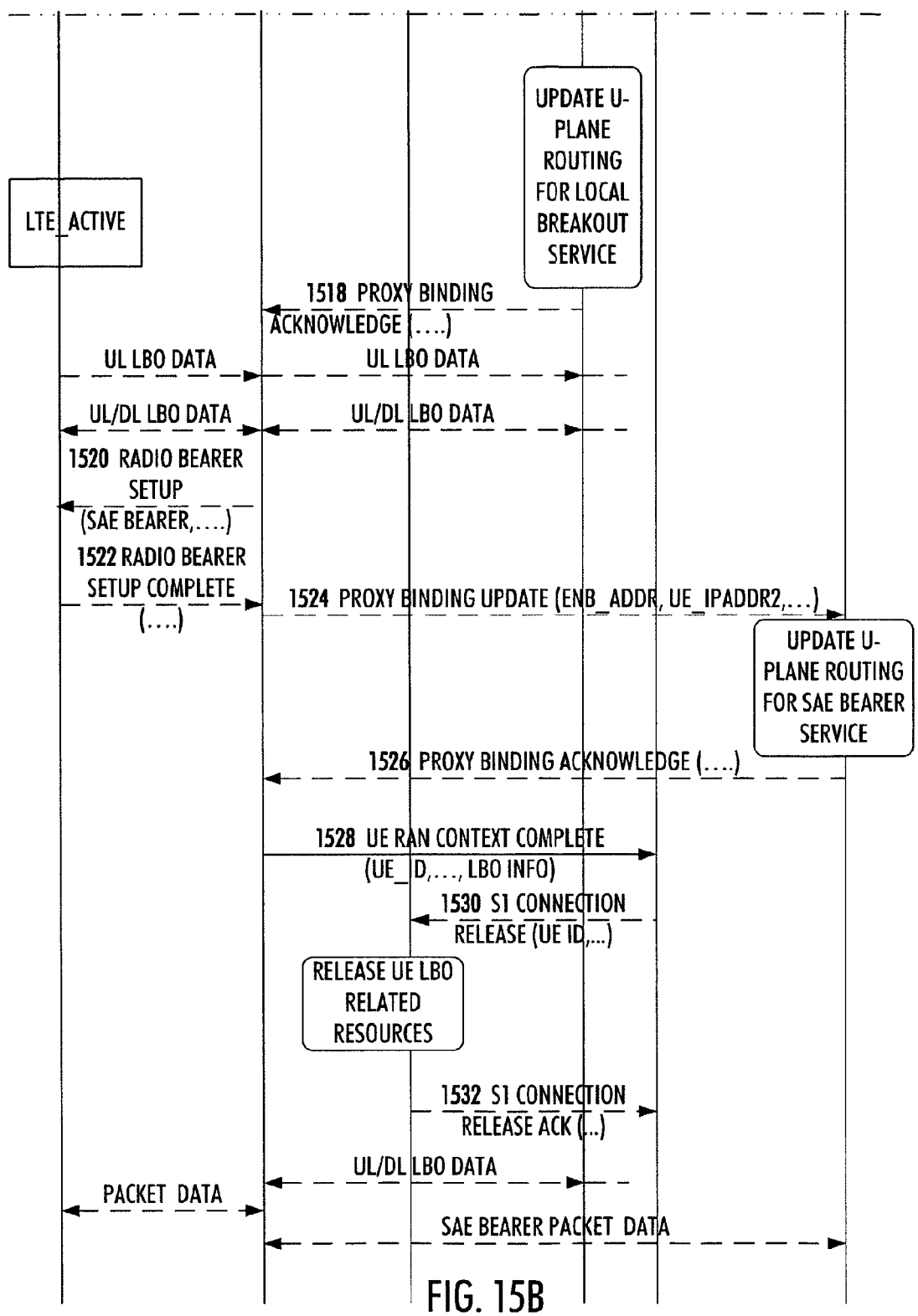

The FIG. 15 illustrates the mobile terminal movement from Idle to Active State transition procedure with local IP breakout service that is triggered by mobile terminal Originated LBO session start.

The mobile terminal Idle to Active transition scenario is triggered by an application in the mobile terminal that will start an IP session using the Local IP Breakout Service.

In 1500, the mobile terminal 150 may select a Cell with proper radio signal quality in which the LBO service can be obtained as a result of neighboring Cell Scan.

In 1502, the mobile terminal 150 performs the RRC Connection Establishment procedure to the selected Cell/eNB 160 indicating its UE Id and the latest serving eNB Id for the LBO service in order to let the MME 106 to release LBO related user context from the latest serving eNB/Paging Agent 165.

In 1504, the new eNB 160 sends the UE RAN Context Request message to the MME 106 that upon reception of the message retrieves the UE RAN context and LBO context to be sent to the requesting new eNB 160.

In 1506, the MME sends the Update UE State message with mobile terminal Id, new eNB Id and LTE_ACTIVE state info to the SAE GW in order to prepare SAE Bearer services on the S1-U interface.

In 1508, the SAE GW sends the Update UE State Response message indicating that the S1 U-plane preparation for is performed.

In 1510, the MME sends the UE RAN Context Response message to the new eNB containing the UE RAN context data, UE LBO Context and the SAE GW related information.

In 1512, the eNB sends the Radio Bearer Setup message to the mobile terminal in order to establish a Radio Bearer for the LBO service.

In 1514, the mobile terminal responds with the Radio Bearer Setup Complete message to the eNB. From now on the mobile terminal has obtained user plane connectivity for the LBO service, has moved to LTE_ACTIVE state.

In 1516, in case the Local IP GW is located behind multiple router hops, the new eNB may send the Proxy Binding Update message to the Local IP GW containing new eNB Address and UE IP Address to LBO services. The IP GW may update U-Plane routing to new eNB. Note, in case the Local IP GW will be the next hop router to the eNB then the eNB may send a Proxy ARP (IPv4) or a Proxy Neighbor Advertisement (IPv6) in order to update binding cache in the Local IP GW (Access Router) and forwarding tables in the possible intermediate L2 Switches.

In 1518, the Local IP GW responds with the Proxy Binding Acknowledge message. From now on the user data for the LBO service may be routed directly to/from the new eNB.

In 1520, the eNB sends the Radio Bearer Setup message to the mobile terminal in order to establish a Radio Bearer for the SAE Bearer service.

In 1522, the mobile terminal responds with the Radio Bearer Setup Complete message to the eNB. From now on the user plane connectivity is available over the radio also for the SAE Bearer services.

In 1524, the eNB may send the Proxy Binding Update message (or GTP-U path update) to the SAE GW in order to switch the u-plane route for the SAE Bearer services to the new eNB.

In 1526, the SAE GW may send the Proxy Binding Acknowledge message (or GTP-U path update ack) to the eNB indicating successful data path switching.

In 1528, the eNB sends the UE RAN Context Complete message to the MME indicating that all services for the mobile terminal are established in the eNB. This message may deliver the latest LBO context data to the MME.

In 1530, the MME sends the S1 Connection Release message to the latest serving eNB/Paging Agent in order to let it to release the mobile terminal LBO related resources.

In 1532, the latest serving eNB/Paging Agent sends the S1 Connection Release Acknowledge message to the MME indicating that it has released mobile terminal related resources.

2.5 Mobile Terminal Network Entry to Local IP Breakout Service after Idle to Active State Transition The mobile terminal may move to a Local IP Breakout Service Area as a result of Idle to Active State Transition procedure. The availability of the local breakout service in the mobile terminal's current LTE Cell/Base Station could be indicated to the mobile terminal by one of the following:

Advertisements in the LTE Cell System Information from the Base Station (configured into LTE Cell/Base Station Radio Network Conf data). The mobile terminal may store this information while receiving Cell System Information during its periodical neighboring Cell signal quality measurements for location tracking and preparation for network re-entry in case a movement from Idle to Active state will be needed (e.g. mobile terminal is paged, mobile terminal originated session is started, location update timer expires).

Indicating the local breakout service availability to the mobile terminal in NAS signalling when mobile terminal has moved to service coverage area, e.g. triggered from Idle to Active State transition (location based service triggered from the Evolved Packet Core).

Mobile terminal itself detects movement to LTE Cell in which Cell Id, Tracking Area Id and Network Id match with the stored information in non-volatile memory of the mobile terminal.

User intervention from application level when the end-user is e.g. at the office (manual registration into Enterprise Network).

Figure 16A:
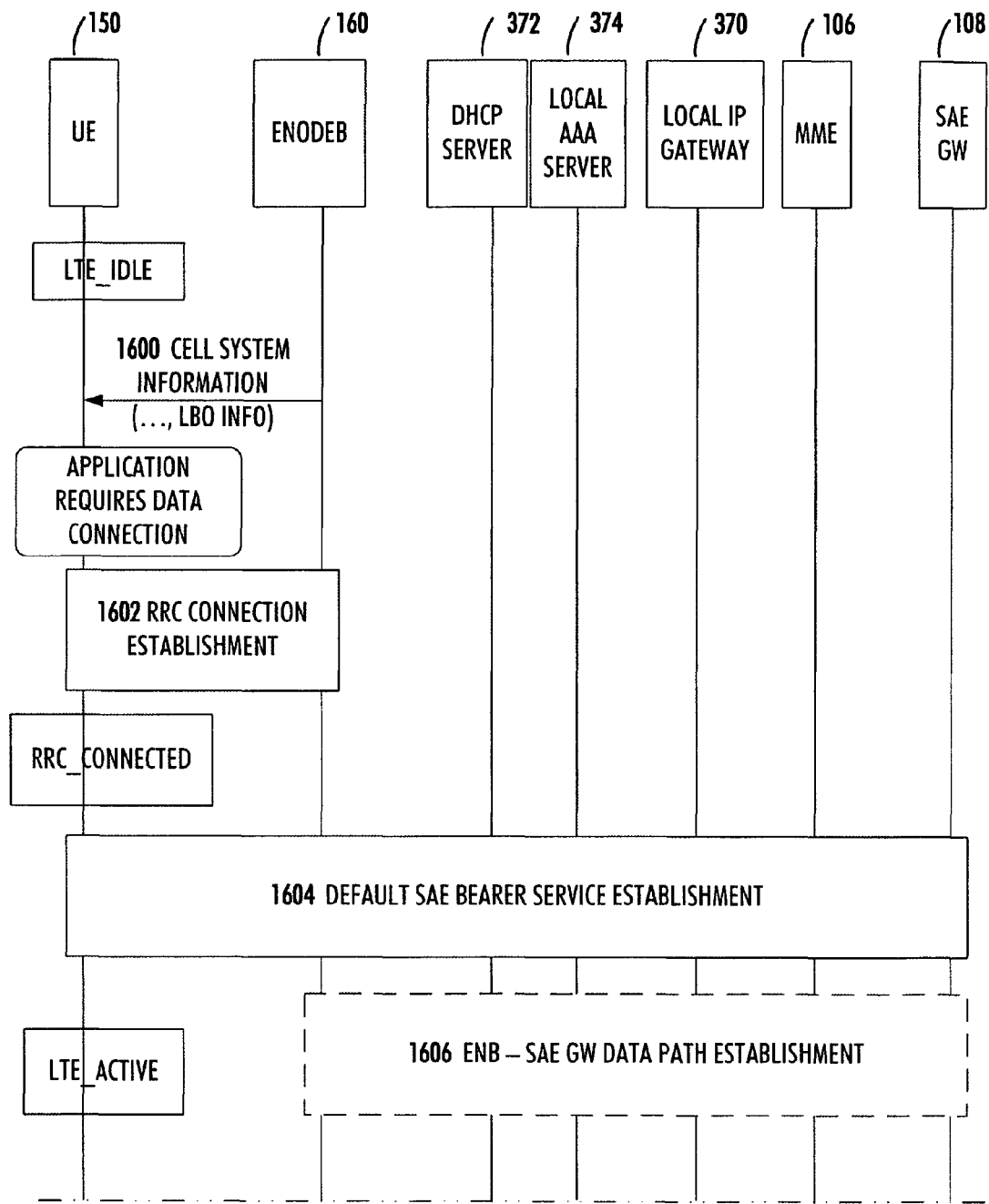
FIG. 16 is a signal sequence diagram illustrating an example of mobile terminal Network entry to local IP breakout service after Idle to Active state transition.
Figure 16B:
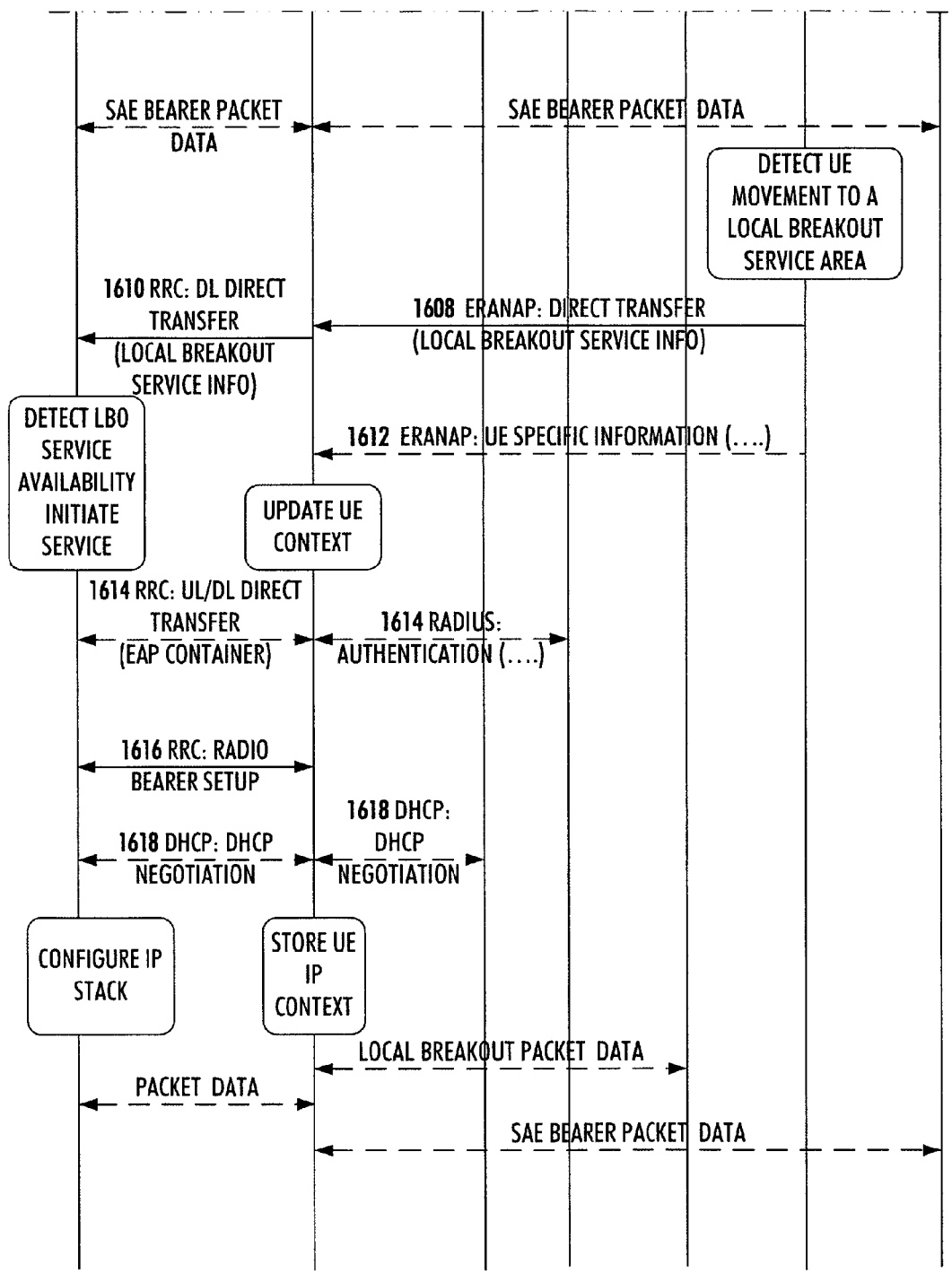

The following signaling flow diagram in FIG. 16 illustrates the mobile terminal Idle to Active State transition procedure when the mobile terminal connects to a LTE Cell/Base Station that provides a Local IP Breakout Service. The mobile terminal must have performed earlier the Network Attach procedure to the LTE/SAE Network and activated the default SAE Bearer Service before the idle to active transition. During the LTE_IDLE state the MME is responsible for storing the User Context data. Any eNodeB via which the mobile terminal is able to re-enter to the LTE/SAE Network is able to retrieve the required UE RAN Context from the MME. The ordinary mobile terminal Idle to Active State transition procedure in LTE/SAE may retain the SAE Bearer services i.e. establish data path from new the eNodeB to the SAE GW. In parallel with, or after that the User/mobile terminal may receive the indication about service availability. Now the network entry procedure to a local IP breakout service could be started either automatically from the mobile terminal, or manually by the end-user intervention.

The Idle to Active transition procedure in FIG. 16 is triggered by mobile terminal originated session (i.e. application requires data connectivity).

In 1600, the mobile terminal may select a Cell with proper radio signal quality as a result of neighboring Cell Scan. In case mobile terminal is set to monitor LBO Service availability, it may use the advertised LBO Info in the Cell System Information for Cell selection criteria, or as a trigger to move from Idle to Active State for performing an automatic network entry to Local IP Breakout service.

In 1602, the mobile terminal performs the RRC Connection Establishment procedure to the selected Cell/eNB.

In 1604, the Network Re-Entry procedure for SAE Bearer Service may be performed according to LTE/SAE standard.

In 1606, the eNB may initiate the eNB—SAE GW Data Path Establishment procedure (PMIP or GTP-U path update) with the SAE GW in order to switch the u-plane route for the SAE Bearer services to the new eNB.

In 1608, the MME may detect that the mobile terminal has moved to Local IP Breakout coverage area, checks if this service is enabled to the mobile terminal in its subscription data and sends a NAS (Non Access Stratum) level message to the mobile terminal containing the Local Breakout Service Info. This could be sent to the eNB in a transparent container enclosed into a Direct Transfer message using eRANAP (S1AP) protocol.

In 1610, the eNB forwards the received transparent container (including the LBO service info) to the mobile terminal in the DL Direct Transfer message.

In 1612, the MME may send the mobile terminal Specific Information message to the eNB containing mobile terminal specific LBO Service information e.g. local identifiers and credentials for local authentication that the eNB stores among the other UE RAN Context data.

In 1614, based on the available LBO Info the mobile terminal/User makes decision for initiating the network entry to Local IP Breakout service that may start with authentication procedure to the local AAA server over the RRC signalling connection using direct transfer messages. The eNB may provide e.g. a client for RADIUS protocol.

In 1616, after successful local authentication the eNB may setup a Radio Bearer for the Local IP Breakout service that opens IP connectivity to the local access network on U-plane.

In 1618, the mobile terminal may obtain a local IP Address using standard DCHP negotiation after which the mobile terminal is able to initiate IP sessions using the APN/IP Address for the LBO Services.

Even though the invention has been described above with reference to an example according to the accompanying drawings, it is clear that the invention is not restricted thereto but it can be modified in several ways within the scope of the appended claims.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method, comprising:
providing a mobile terminal with a local breakout service to a local Internet protocol gateway without traversing a remote Internet protocol gateway of a packet core network of a public mobile network, while retaining user access control and with access to the remote Internet protocol gateway of the packet core network of a public mobile network;
providing information on neighboring cells in which the local breakout service can continue;
making a handover decision based on measurement reports received from the mobile terminal; and
transferring user context data including local breakout service related information from a source base station to a target base station during handover for providing mobility of the mobile terminal within the local breakout service area, while maintaining services provided from the packet core network for the mobile terminal, using separate access to the remote Internet protocol gateway.

2. The method of claim 1, further comprising providing a list of neighboring cells and tracking area identifier in conjunction with an initial attach procedure, network entry to local breakout service, or in ordinary handover related measurement control from a base station to the mobile terminal.

3. The method of claim 2, further comprising: prioritizing cells in which the local breakout service can continue when the handover decision is being made.

4. The method of claim 3, further comprising: providing the local breakout service from a public mobile network base station to a tracking area including multiple neighboring base stations.

5. The method of claim 4, further comprising: monitoring activity of the mobile terminal and on the basis of the monitored activity making a decision for changing the mobile terminal between active mode mobility and idle mode mobility.

6. The method of claim 5, further comprising: releasing a radio link connection and user-related resources, and transferring user context data to be stored in the packet core network, when a decision for changing from active mode mobility to an idle mode mobility is made.

7. The method of claim 6, further comprising: paging the mobile terminal via all the base stations in the current tracking area of the mobile terminal when a network-originated call occurs in an idle mode mobility.

8. The method of claim 7, further comprising: changing from idle mode mobility to active mode mobility upon reception of a paging command or due to a mobile terminal originated session for re-entering the local breakout service.

9. The method of claim 8, further comprising: performing functions of a local paging agent by the latest serving base station of the mobile terminal when the mobile terminal is in an idle mode.

10. The method of claim 9, further comprising: providing information about base stations in the local breakout service area included in a Tracking Area to a mobile terminal in idle mode for enabling the mobile terminal to activate or to continue using the local breakout service.

11. The method of claim 10, further comprising: monitoring, by a mobile terminal, the remaining of the mobile terminal within the local breakout service coverage area, and selecting a cell where local breakout service is available when changing from idle mode to active mode.

12. The method of claim 11, further comprising: initiating a re-entry timer when a mobile terminal movement out of the local breakout service coverage area is detected for retaining local breakout service related resources.

13. A radio system in a public mobile network having a packet core network and servicing at least one mobile terminal, comprising:
a local breakout service network providing Internet protocol gateway services; and
a plurality of base stations, including a serving base station configured to provide one of the mobile terminals with access to the Internet protocol gateway services, via the local breakout service network without traversing a remote Internet protocol gateway of the packet core network of the public mobile network, while retaining user access control, and with access to the remote Internet protocol gateway of the packet core network of the public mobile network; to provide information on neighboring cells in which local breakout service can continue; to make a handover decision based on measurement reports received from the one of the mobile terminals;

and to transfer user context data including local breakout service related information to a target base station among the base stations, during handover for providing mobility within the local breakout service network for the one of the mobile terminals, while maintaining services provided from the packet core network for the one of the mobile terminals, using separate access to the remote Internet protocol gateway.

14. The system of claim 13, wherein the serving base station is configured to provide a list of neighboring cells and a tracking area identifier from the serving base station to the one of the mobile terminals in conjunction with an initial attach procedure, network entry to the local breakout service, or ordinary handover-related measurement control.

15. The system of claim 14, wherein the serving base station is configured to prioritize cells in which the local breakout service can continue when the handover decision is being made.

16. The system of claim 15, wherein the serving base station is configured to provide the local breakout service to a tracking area including multiple neighboring base stations.

17. The system of claim 16, wherein the serving base station is configured to monitor the activity of the one of the mobile terminals, and to make a decision for changing the one of the mobile terminals between active mode mobility and idle mode mobility based on the monitored activity.

18. The system of claim 17, wherein the serving base station is configured to release a radio link connection and user related resources and to transfer user context data to be stored in the packet core network, when a decision for changing from active mode mobility to an idle mode mobility is made.

19. The system of claim 18, wherein the serving base station is configured to page the one of the mobile terminals via all the base stations in the current tracking area of the one of the mobile terminals when a network-originated call occurs in an idle mode mobility.

20. The system of claim 19, wherein the serving base station is configured to change from idle mode mobility to active mode mobility upon reception of a paging command or due to a mobile-terminal-originated session for re-entering the local breakout service.

21. A base station of a public mobile network having other base stations and a packet core network with a remote Internet protocol gateway, the base station servicing a mobile terminal by providing access to a local breakout service network, comprising:
at least one processing unit configured to provide the mobile terminal with access to the remote Internet protocol gateway of the packet core network of the public mobile network and with a local breakout service for access to Internet protocol gateway services using the local breakout service network without traversing the remote Internet protocol gateway, while retaining user access control, and to make a handover decision based on measurement reports received from the mobile terminal; and
at least one communication unit configured to communicate with the mobile terminal and with the local breakout service network to provide the Internet protocol gateway services to the mobile terminal, to provide information on neighboring cells in which the local breakout service can continue; and to transfer user context data including local breakout service related information to a target base station among the other base stations in the public mobile network during handover for providing mobility within the local breakout service area for the mobile terminal, while services provided from the packet core network for the mobile terminal using separate access to the remote Internet protocol gateway are maintained.

22. The base station of claim 21, wherein the base station is further configured to provide a list of neighboring cells and a tracking area identifier from the serving base station to the mobile terminals in conjunction with an initial attach procedure, network entry to the local breakout service, or ordinary handover-related measurement control.

23. The base station of claim 22, wherein the base station is further configured to prioritize cells in which the local breakout service can continue when the handover decision is being made.

24. The base station of claim 23, wherein the base station is further configured to provide the local breakout service to a tracking area including multiple neighboring base stations.

25. The base station of claim 24, wherein the base station is further configured to monitor the activity of the mobile terminal, and to make a decision for changing the mobile terminal between active mode mobility and idle mode mobility based on the monitored activity.

26. The base station of claim 25, wherein the base station is further configured to release a radio link connection and user related resources, and to transfer user context data to be stored in the packet core network, when a decision for changing from active mode mobility to an idle mode mobility is made.

27. The base station of claim 26, wherein the base station is further configured to page the mobile terminal via all the base stations in the current tracking area of the mobile terminal, when a network originated call occurs in an idle mode mobility.

28. The base station of claim 27, wherein the base station is configured to change from idle mode mobility to active mode mobility upon reception of a paging command or due to a mobile terminal originated session for re-entering the local breakout service.

29. A tangible computer program distribution medium readable by a computer and encoding instructions that when executed cause the computer to perform a process comprising:
providing a mobile terminal with a local breakout service to a local Internet protocol gateway without traversing a remote Internet protocol gateway of a packet core network of a public mobile network, while retaining user access control and with access to the remote Internet protocol gateway of the packet core network of a public mobile network;
providing information on neighboring cells in which the local breakout service can continue;
making a handover decision based on measurement reports received from the mobile terminal; and
transferring user context data including local breakout service related information from a source base station to a target base station during handover for providing mobility of the mobile terminal within the local breakout service area, while maintaining services provided from the packet core network for the mobile terminal, using separate access to the remote Internet protocol gateway.

30. The tangible computer program distribution medium of claim 29, the tangible distribution medium including at least one of the following media: a computer readable medium, a program storage medium, a record medium, a computer readable memory, a computer readable software distribution package, and a computer readable compressed software package.

31. A radio system comprising:
- a public mobile network having at least one base station and a packet core network with a remote Internet protocol gateway;
- at least one mobile terminal communicating with the at least one base station;
- a local breakout service network providing Internet protocol gateway services;
- processing means for providing the at least one mobile terminal with a local breakout service to access the Internet protocol gateway services without traversing the remote Internet protocol gateway while retaining user access control and with access to the remote Internet protocol gateway of the packet core network of the public mobile network, and for making a handover decision based on measurement reports received from the mobile terminal; and
- communication means for providing information on neighboring cells in which the local breakout service can continue and for transferring user context data including local breakout service related information to a target base station during handover for providing mobility of the mobile terminal within the local breakout service area, while services provided from the packet core network for the mobile terminal using separate access to the remote Internet protocol gateway are maintained.

32. The system of claim 31, wherein the communication means further provides a list of neighboring cells and a tracking area identifier from the at least one base station to the at least one mobile terminal in conjunction with an initial attach procedure, network entry to the local breakout service, or ordinary handover related measurement control.

33. The system of claim 32, wherein the processing means further performs prioritizing of cells in which the local breakout service can continue when the handover decision is being made.

34. A base station of a public mobile network having other base stations and a packet core network with a remote Internet protocol gateway, the base station servicing at least one mobile terminal by providing access to a local Internet protocol gateway in a local breakout service network, comprising:
- processing means for providing a mobile terminal with a local breakout service to access the local Internet protocol gateway without traversing a remote Internet protocol gateway of a packet core network of a public mobile network, while retaining user access control and with access to the remote Internet protocol gateway of the packet core network of the public mobile network, and for making a handover decision based on measurement reports received from the mobile terminal; and
- communication means for providing information on neighboring cells in which the local breakout service can continue and for transferring user context data including local breakout service related information to a target base station among the other base stations during handover for providing mobility of the mobile terminal within the local breakout service area, while services provided from the packet core network for the mobile terminal using separate access to the remote Internet protocol gateway are maintained.

35. The base station of claim 34, wherein the communication means further provides a list of neighboring cells and a tracking area identifier from the base station to the mobile terminal in conjunction with an initial attach procedure, network entry to the local breakout service, or ordinary handover related measurement control.

36. The base station of claim 35, wherein the processing means further performs prioritizing of cells in which the local breakout service can continue when the handover decision is being made.

* * * * *